(12) United States Patent
Lemenager et al.

(10) Patent No.: US 8,789,620 B2
(45) Date of Patent: Jul. 29, 2014

(54) METHOD AND APPARATUS FOR TRANSMITTING OR RECEIVING INFORMATION BETWEEN DOWNHOLE EQUIPMENT AND SURFACE

(75) Inventors: Erwan Lemenager, Clamart (FR); Martin Luling, Clamart (FR); Yves Mathieu, Clamart (FR); Christian Chouzenoux, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 1909 days.

(21) Appl. No.: 11/996,996

(22) PCT Filed: Jul. 28, 2006

(86) PCT No.: PCT/IB2006/002110
§ 371 (c)(1),
(2), (4) Date: Mar. 15, 2011

(87) PCT Pub. No.: WO2007/023341
PCT Pub. Date: Mar. 1, 2007

(65) Prior Publication Data
US 2011/0168446 A1 Jul. 14, 2011

(30) Foreign Application Priority Data
Jul. 29, 2005 (EP) .................................. 05291628

(51) Int. Cl.
*E21B 47/00* (2012.01)
(52) U.S. Cl.
USPC ......... 175/40; 175/50; 340/854.5; 340/854.6; 324/366; 367/82

(58) Field of Classification Search
USPC ............ 175/40, 50; 340/854.3, 854.5, 854.6; 324/366, 368; 367/82
See application file for complete search history.

(56) References Cited

U.S. PATENT DOCUMENTS

| 4,808,929 | A | 2/1989 | Oldigs |
| 4,839,644 | A | 6/1989 | Safinya et al. |
| 5,394,141 | A | 2/1995 | Soulier |
| 5,883,516 | A | 3/1999 | Van Steenwyk et al. |
| 6,246,240 | B1 | 6/2001 | Vail, III |
| 6,396,276 | B1 | 5/2002 | Van Steenwyk et al. |
| 6,817,412 | B2 | 11/2004 | Haase |
| 6,975,121 | B2 * | 12/2005 | Strack et al. ................ 324/347 |
| 7,202,671 | B2 | 4/2007 | Stack et al. |
| 2001/0033164 | A1 | 10/2001 | Vinegar |
| 2002/0105334 | A1 | 8/2002 | Aiello |
| 2003/0102980 | A1 | 6/2003 | Koro |
| 2003/0151977 | A1 | 8/2003 | Shah |

OTHER PUBLICATIONS

GCC Examination Report dated Dec. 12, 1011 for corresponding GC Application No. GCC/P/2006/6682 filed Jul. 29, 2006.

* cited by examiner

Primary Examiner — Nicole Coy
(74) Attorney, Agent, or Firm — Cameron R. Sneddon

(57) ABSTRACT

The invention provides a method of receiving and/or transmitting information in a well drilled in a geological formation between a first location and a second location, the well comprising a casing communicating with the geological formation. The method comprises placing a first transducer at a first location, placing a second transducer at a second location. Transmitting an electric signal between the first and second transducers.

45 Claims, 18 Drawing Sheets

METHOD AND APPARATUS FOR TRANSMITTING OR RECEIVING INFORMATION BETWEEN DOWNHOLE EQUIPMENT AND SURFACE

FIELD OF THE INVENTION

The present invention broadly relates to wireless telemetry. More particularly the invention relates to an apparatus and related method for transmitting or receiving information between a downhole equipment connected to an underground tubing or casing and a surface device.

DESCRIPTION OF THE PRIOR ART

Oil and gas wells are expensive to construct, and it is advantageous to operate these wells as efficiently as possible. One way of providing for an increased efficiency in the operation of wells is to place equipment downhole in the well bore under the control of other equipment located on the surface. The equipment can be measurement sensors which supply useful information for the subsequent working of the well, for example data regarding pressure, the nature of the solids and fluids encountered, the temperature, etc. The equipment can be other controllable or monitoring equipments which supply important orders from the surface to control various parameters of the well or the reservoir with equipment and device such as valves, protective covers, etc. It is therefore important to be able to transmit information from the surface to various downhole equipments. Several prior art methods have attempted to provide electrically or electromagnetically communications between the surface equipment and the downhole equipment.

Traditionally, some prior art systems have placed cables in the well bore to provide communications and also power to the downhole equipment. Safely and accurately placing the cables within the well bore along side of the piping structure or string is difficult and time consuming to achieve. In addition, this requires additional equipment to be used increasing the costs associated with the well. Well bores are a harsh environment, and numerous failure mechanisms exist that cause the reliability of such systems to be unacceptably low. Furthermore, a cable incorporating such sensors, or being connected to control devices, located at a substantial depth cannot be lowered in every situation. The installation of such cable is possible when completing the well, but become practically impossible when the well is completed. In particular, the cable may not be able to be lowered when valves or separation devices cannot be crossed by a cable, whether or not the cable is fitted with sensors.

Some other prior art systems have attempted to use wireless communication system, relying upon the inherent coaxial nature of the well bore and the piping structure or tubing string disposed within the bore. These prior art systems however, typically provide a higher frequency data signal. These systems typically use toroidal coils or ferromagnetic choke assemblies placed on the piping structure or strings to provide a sufficiently large series impedance to the data signals to electrify a predefined portion of the piping structure or string. U.S. Pat. No. 4,839,644 describes such a method and system for wireless communications in a cased borehole having a tubing string.

Other prior art systems are based on transmission of electromagnetic waves guided by metal tubing; this transmission system is more particularly described in U.S. Pat. No. 5,394,141 (FIG. 1). A transmitter 3 is located downhole in the well and applies electric signals between two points 1 and 2 on a metal tubing 4. The electric signal can flow trough the metal tubing 4, the casing 5 or even the conductive fluid 6 filling the well; but due to sufficient impedance of the metal tubing the electric signal is transmitted to a surface transceiver 8. However, the required sufficient impedance largely depends on the geometric characteristics of the well and on the impedance of the surrounding environment: filling fluid, metal tubing, casing, formation, etc. It is better to limit or control the dependency of those parameters. For example, if the resistivity of certain layers is inadequate, as is the case with certain sedimentary, tertiary, pericontinental rocks like those of the North Sea or the Gulf of Mexico, the attenuation can become excessive along the well, which makes it impossible to use such a device in most offshore wells unless it is possible to accept a drastic reduction in the transmitted information flow.

Therefore, it would be advantageous to provide an improved system for wireless communication in a well bore not depending of all these parameters.

SUMMARY OF THE INVENTION

The invention provides a method of receiving and/or transmitting information in a well drilled in a geological formation between a first location and a second location, said well comprising a casing communicating with the geological formation, the method comprising: (i) placing a first transducer located at said first location, said first transducer comprising two electrodes, which are first and second downstream electrodes, said first and second downstream electrodes being substantially in electrical contact with the casing; (ii) placing a second transducer located at said second location, said second transducer comprising two electrodes, which are first and second upstream electrodes; (iii) transmitting an electric signal with the first transducer by applying said signal between the first and second downstream electrodes or respectively with the second transducer by applying said signal between the first and second upstream electrodes; (iv) receiving said electric signal with the second transducer by detecting said signal between the first and second upstream electrodes or respectively with the first transducer by detecting said signal between the first and second downstream electrodes. Effectively, the first and second downstream electrodes are substantially in electrical contact with the casing, as no real control of the perfect electrical contact can be established when the first transducer is deployed in the well. At least, the first and second downstream electrodes have respectively a first downstream electrical resistance and a second downstream electrical resistance when in contact with the casing which should be as lowest as possible. Because, of presence of non conductive mud within the casing or non conductive material on the casing, the resistance is not null. Preferably, the first downstream electrical resistance and/or the second downstream electrical resistance is/are below one thousand Ohms; more preferably, below one hundred Ohms; most preferably, ten Ohms.

In another embodiment, the well further comprises a third transducer, said third transducer located at a third location and comprising two electrodes, which are first and second well electrodes, said first and second well electrodes being substantially in electrical contact with the casing; and the method comprising the step of: (i) transmitting a second electric signal with the third transducer by applying said second signal between the first and second well electrodes; and (ii) receiving a third electric signal with the third transducer by detecting said third signal between the first and second well electrodes. The well can further comprise a plurality of additional transducers; every transducer can receive and/or transmit information to anyone of the transducers. A network of transducers is so defined. At least, the first and second well electrodes have respectively a first well electrical resistance and a second well electrical resistance when in contact with the casing which should be as lowest as possible. Because, of presence of non conductive mud within the casing or non conductive material on the casing, the resistance is not null. Preferably, the first well electrical resistance and/or the second well electrical resistance is/are below one thousand Ohms; more preferably, below one hundred Ohms; most preferably, ten Ohms.

In another embodiment, the well further comprises a relay transducer, said relay transducer located at a third location and comprising two electrodes, which are first and second well electrodes, said first and second well electrodes being substantially in electrical contact with the casing; and the method further comprising the step of: (i) receiving the electric signal with the third transducer by detecting said signal between the first and second well electrodes; and (ii) transmitting the electric signal with the third transducer by applying said signal between the first and second well electrodes. The well can further comprising a plurality of additional relay transducers. The advantages of using relays are to increase the range of the communication and/or to communicate with various locations in the well. At least, the first and second well electrodes have respectively a first well electrical resistance and a second well electrical resistance when in contact with the casing which should be as lowest as possible. Because, of presence of non conductive mud within the casing or non conductive material on the casing, the resistance is not null. Preferably, the first well electrical resistance and/or the second well electrical resistance is/are below one thousand Ohms; more preferably, below one hundred Ohms; most preferably, ten Ohms.

The method can apply when the first location is in the well and the second location is at the surface of the geological formation or when the first and second locations are in the well and/or when the third location is in the well.

Preferably, the well comprises a tubing and at least one of the electrodes taken in the list: first downstream electrode, second downstream electrode, first upstream electrode, second upstream electrode, first well electrode, second well electrode, electrodes from the other transducers, is insulated electrically from the tubing, preferably also, is further insulated electrically from other conductive elements in the well and preferably also, is further shielded electromagnetically. The insulation allows controlling the injected current between electrodes independently of the potential of the tubing or of the other conductive elements. The effects of the electrical insulation of the electrode are clearly tangible and useful for the better efficiency of the receiving and/or transmitting method. The electrical insulation increases the signal to noise ratio. The shielding avoids and protects against electrical interferences coming from the well.

Preferably, the first distance $d_1$ between the first and the second downstream electrodes is dependent of intensity of the electric signal and of the distance between the first and second downstream electrodes and the first and second upstream electrodes; and/or the first distance $d_1$ between the first and the second downstream electrodes is dependent of intensity of the electric signal and of the distance between the first and second downstream electrodes and the first and second well electrodes; and/or the third distance $d_3$ between the first and the second well electrodes is dependent of the electric signal and of the distance between the first and second well electrodes and the first and second upstream electrodes. The dependency principally reflects the fact that electrical signal intensity from one point to the other will be dependent of the traveled distance, of the distance between electrodes and of physical characteristics of the formation.

In one embodiment, the first and second upstream electrodes are in electrical contact with the formation at the surface.

In a second embodiment, the first upstream electrode is in electrical contact with the tubing and the second upstream electrode is in electrical contact with the formation at the surface.

The first transducer, second transducer and/or third transducer, can be connected to a measurement sensor and/or a control/monitoring equipment; also the electric signal communicated by the transducers contained information from the measurement sensor and/or to the control/monitoring equipment.

In another aspect of the invention, an apparatus for receiving and/or transmitting information in a well drilled in a geological formation between a first location and a second location is disclosed, said well comprising a casing communicating with the geological formation, and the apparatus comprising: (i) a first transducer located at said first location, said first transducer comprising two electrodes, which are first and second downstream electrodes, said first and second downstream electrodes being substantially in electrical contact with the casing; and (ii) a second transducer located at said second location, said second transducer comprising two electrodes, which are first and second upstream electrodes. Effectively, the first and second downstream electrodes are substantially in electrical contact with the casing, as no real control of the perfect electrical contact can be established when the first transducer is deployed in the well. At least, the first and second downstream electrodes have respectively a first downstream electrical resistance and a second downstream electrical resistance when in contact with the casing which should be as lowest as possible. Because, of presence of non conductive mud within the casing or non conductive material on the casing, the resistance is not null. Preferably, the first downstream electrical resistance and/or the second downstream electrical resistance is/are below one thousand Ohms; more preferably, below one hundred Ohms; most preferably, ten Ohms.

In another embodiment, the apparatus further comprises at least another third transducer, said third transducer located at a third location and comprising two electrodes, which are first and second well electrodes, said first and second well electrodes being substantially in electrical contact with the casing. The third transducer can be a relay transducer. The advantages of using relays are to increase the range of the communication and/or to communicate with various locations in the well. At least, the first and second well electrodes have respectively a first well electrical resistance and a second well electrical resistance when in contact with the casing which should be as lowest as possible. Because, of presence of non conductive mud within the casing or non conductive material on the casing, the resistance is not null. Preferably, the first well electrical resistance and/or the second well electrical resistance is/are below one thousand Ohms; more preferably, below one hundred Ohms; most preferably, ten Ohms.

The apparatus can be positioned with the first location in the well and the second location at the surface of the geological formation or with first and second locations in the well and/or with the third location in the well.

Preferably, the well comprises a tubing and at least one of the electrodes taken in the list: first downstream electrode, second downstream electrode, first upstream electrode, second upstream electrode, first well electrode and second well electrode, is insulated electrically from the tubing, preferably also, is further insulated electrically from other conductive elements in the well and preferably also, is further shielded electromagnetically. The insulation allows controlling the injected current between electrodes independently of the potential of the tubing or of the other conductive elements. The effects of the electrical insulation of the electrode are clearly tangible and useful for the better efficiency of the receiving and/or transmitting method. The electrical insulation increases the signal to noise ratio. The shielding avoids and protects against electrical interferences coming from the well.

In one embodiment, the first and second upstream electrodes are in electrical contact with the formation at the surface.

In a second embodiment, the first upstream electrode is in electrical contact with the tubing and the second upstream electrode is in electrical contact with the formation at the surface.

The first and/or the second downstream and/or well electrode can be any chosen in the list: a composite material which is constituted by a fine layer of polycrystalline diamond compact (PDC), a metallic bow spring, and a metallic caliper.

In another embodiment, the electrodes can be located on one or several packers. Various embodiments are possible:
  the first downstream electrode can be located on a first packer;
  the second downstream electrode can be located on a second packer;
  the first and second downstream electrodes can be located on a downstream packer;
  the first well electrode can be located on a third packer;
  the second well electrode can be located on a fourth packer;
  the first and second well electrodes can be located on a well packer.

Preferably, the deployment of one packer or several is controlled by the voltage difference between first and second downstream electrodes and/or first and second well electrodes. When the packer is deflated, the electrodes can be protected by a seal or paint cover, the voltage difference being small between the two electrodes, corresponding to a high impedance between the both electrodes. The seal or paint cover is used when annular fluids are highly conductive, when annular fluids are practically non conductive the seal is optional, because the voltage difference will be always small. When the packer inflates and starts touching the casing inner wall the deployment pressure will puncture the seal or the insulating paint and force-push the electrodes into the metal of the casing. This way, an electric contact between the electrodes and the conductive casing is established. The current between the electrodes increases accordingly, thus indicating the successful deployment of the packer.

The first transducer, second transducer, well and/or relay transducer can be connected to a measurement sensor and/or a control/monitoring equipment.

According to another aspect of the invention, a method to determine the conductivity profile of a formation from a well between a first location at a surface and a second location in a borehole is disclosed, the method comprising: (i) placing a first sensor located at said first location, said first sensor detecting electric field occurring at said first location from the formation; (ii) placing a second sensor located at said second location, said second sensor detecting electric field occurring at said second location from the formation; (iii) obtaining a first signal by detecting Schumann resonances from said electric field occurring at said first location with said first sensor; (iv) obtaining a second signal by detecting Schumann resonances from said electric field occurring at said second location with said second sensor; and (v) combining said first and said second signal to determine the conductivity profile of the formation between said first location and said second location.

Preferably, the first signal is a calibration signal and the combining step is a step of comparison of the first signal and the second signal. The method can further comprises the step of changing the second location within the borehole and obtaining adequate signals by detecting Schumann resonances and combining those adequate signals to determine the conductivity profile of the formation between the borehole and the surface. For the first signal, second signal and adequate signals, at least two different Schumann resonance frequencies can be obtained and computed.

According to another aspect of the invention, the method further comprises a third location in the borehole and the steps of: placing a third sensor located at said third location, said third sensor detecting electric field occurring at said third location from the formation; obtaining a third signal by detecting Schumann resonances from said electric field occurring at said third location with said third sensor; combining said first and said third signal to determine the conductivity profile of the formation between said first location and said third location; and combining said second and said third signal to determine the conductivity profile of the formation between the borehole and the surface.

Preferably, the first signal is a calibration signal and the combining step is a step of comparison of the first signal and the third signal. For the first signal, second signal and third signal, at least two different Schumann resonance frequencies can be obtained and computed.

In one embodiment, the method to determine the conductivity profile using Schumann resonances is realized with an apparatus as described above.

According to another aspect of the invention, an apparatus to determine the conductivity profile of a formation from a well between a first location at a surface and a second location in a borehole is disclosed, said apparatus comprising: (i) a first sensor located at said first location, said first sensor detecting electric field occurring at said first location from the formation; and simultaneously (ii) a second sensor located at said second location, said second sensor detecting electric field occurring at said second location from the formation.

Preferably, the first and/or second sensor has sensibility and resolution to detect Schumann resonances from said electric field occurring at said first location, respectively and/or at said second location. The apparatus is lowered in the borehole from the surface.

BRIEF DESCRIPTION OF THE DRAWINGS

Further embodiments of the present invention can be understood with the appended drawings.

DETAILED DESCRIPTION

Figure 1:
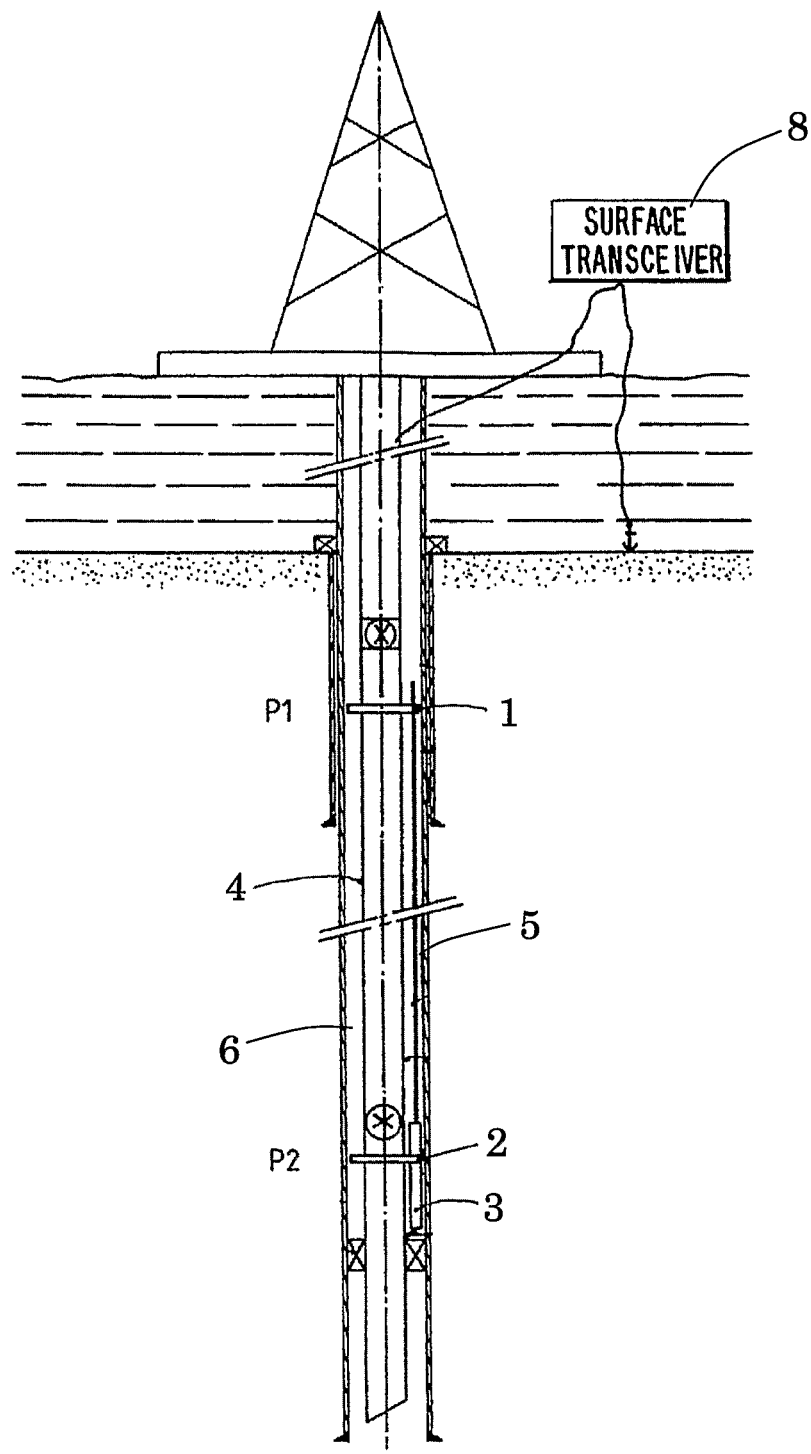
FIG. 1 shows a schematic view of an apparatus for offshore drilling for wireless communication from Prior Art.
Figure 2:
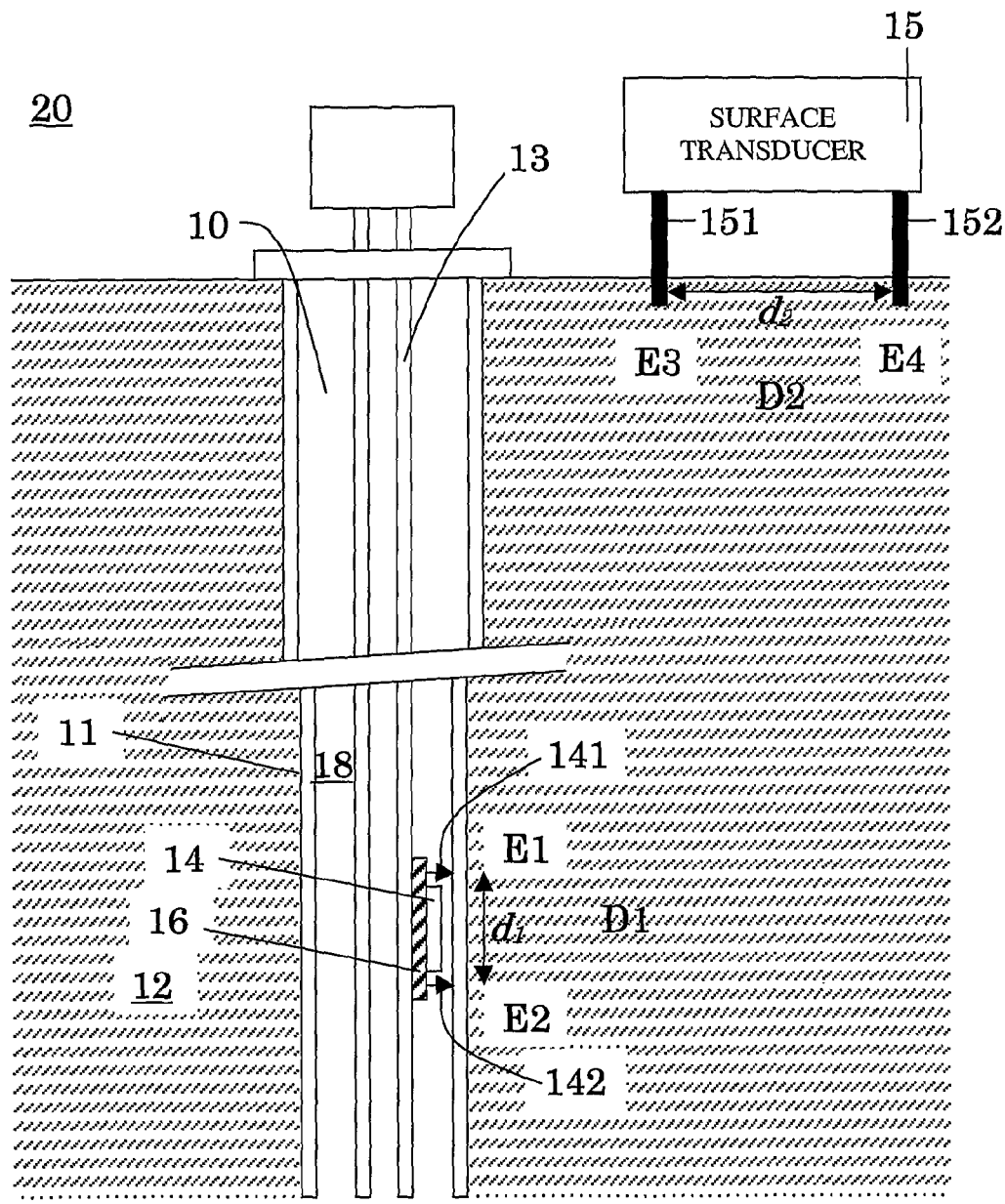
FIG. 2 shows a schematic diagram of an apparatus for wireless communication according to an embodiment of the present invention.

FIG. 2 is an illustration of the apparatus according to the present invention in a first embodiment. A first transducer 14, the well transducer, is installed in a well 10, the well comprising a tubing 13 and a casing 11 surrounding formation 12. An annular 18 is formed between the casing and the tubing, which is filled with an annular fluid. The casing and the tubing are conductive, normally made of steel. The well transducer has an upper electrode 141 which ensures contact with the casing at a pole E1 and an upon electrode 142 which also ensures contact with the casing at a pole E2. Preferably, the upper electrode 141 and/or the upon electrode 142 are/is insulated electrically from the tubing 13 with an insulator 16. Additionally, the upper electrode 141 and/or the upon electrode 142 are/is insulated against other conductive elements in the well, such as highly conductive annular fluids. The insulation allows to control the injected current between the electrodes 141 and 142 independently of the potential of the tubing or of the annular fluid or even of other conductive elements. Preferably also, the upper electrode 141 and/or the upon electrode 142 have/has a shielding. An insulated metallic element surrounding the electrodes can be this shielding. The shielding avoids and protects against electrical interferences coming from the well, more precisely from the inside of the casing such as the annular fluid or from the tubing. The design of the electrodes 141 and 142 will be explained in more details hereinafter. The effectiveness of the apparatus is proportional to the distance $d_1$ between E1 and E2. The poles E1 and E2 with the characterized distance $d_1$ will define the well dipole D1. The dipole D1 can extend over a considerable distance of the casing going from 10 feet (3 meters) to 3000 feet (1000 meters), preferably chosen in the range from 30 feet (10 meters) to 300 feet (100 meters). In case of highly conductive annular fluids, the casing can be coated with an electrically insulating deposit such as epoxy. This coating will significantly reduce the electrical losses into conductive annular fluids.

A second transducer 15, the surface transducer, is installed at the surface 20. The surface transducer has a first electrode 151 which ensures contact with the formation at a pole E3 and a second electrode 152 which also ensures contact with the formation at a pole E4. The design of the electrodes 151 and 152 will be explained in more details hereinafter. The effectiveness of the apparatus is also proportional to the distance $d_2$ between E3 and E4. The poles E3 and E4 with the characterized distance $d_2$ will define the surface dipole D2. The dipole D2 can extend over a considerable distance of the formation going from 10 feet (3 meters) to 3000 feet (1000 meters), preferably chosen in the range from 150 feet (50 meters) to 600 feet (200 meters).

The well transducer 14 according to the present invention can be constituted of a protective housing comprising an electronics package and two insulated cables connected respectively to the electrodes 141 and 142. The electronics package ensures function of the transducer, and comprises, as for example, a signal processing unit and a power supply unit. The processing unit can further comprise a transmission and reception communication unit, a programmable micro-controller and a memory unit. The protective housing of the well transducer can be located on the inner or outer surface of the tubing or even on the inner or outer surface of the casing. The insulated cables connect the protective housing to the upper and upon electrodes.

The electronics package can be connected to measurement sensors (not shown). The sensor can be mounted on the outer or inner surface of the casing or tubing. Various types of sensors and technology can be implemented. Sensors can measure properties from the formation or alternatively properties from the well infrastructure as casing or tubing, or even alternatively properties from fluid inside the well; combination of several sensors measuring various properties is also possible. Such sensors can, for example, measure the fluid pressure or velocity inside the well or measure the surrounding formation fluid pressure, resistivity, salinity or detect the presence of chemical components such as $CO_2$ or $H_2S$, the sensors can also be applied to measure casing or tubing properties such as corrosion, strain and stress. As example, the following types of sensors can be implemented:

Pressure and temperature,
Resistivity (or conductivity),
Casing and Tubing stress or strain,
pH of surrounding fluids,
Chemical content such as $CO_2$ and $H_2S$ monitoring.

Multi-sensors can also be used, for example two sensors to measure both electric and magnetic fields at very high sensitivity. The considerable benefit of using both E and B sensors is not just to collect their individual outputs separately, but rather to combine their outputs to provide an integrated, processed electromagnetic system output. The electric and magnetic field data can be synthesized to reduce the amount of noise or interferences by combining channel data, while yielding improved fidelity by exploiting specific physical relationships between E and B data for specific targets and environmental conditions. Other type of multi-sensor can also be used, by combining both electric and magnetic fields and temperature or pressure measurements.

The electronics package can also be connected to control or monitoring equipments (not shown). The equipments can be passive or active control equipments, one can be activated directly from the surface through the communication apparatus according to the present invention, additionally the equipment can confirm its activation also through the communication apparatus to the surface; and the other one can be auto-activated downhole when predefined well properties are reached, the equipment confirms so its activation through the communication apparatus to the surface. Such equipments can be for example: controllable valve, protective cover and expandable packer.

Apparatus according to the invention can be used to monitor formation or monitor/control well properties in various domains, such as:

Oil and Gas Exploration and Production,
Water storage,
Gas Storage,
Waste underground disposal (chemicals and nuclear).

The electrodes 141 and 142 can be any one of the electrodes here below presented either with the same electrodes or with different electrodes.

Figure 6:
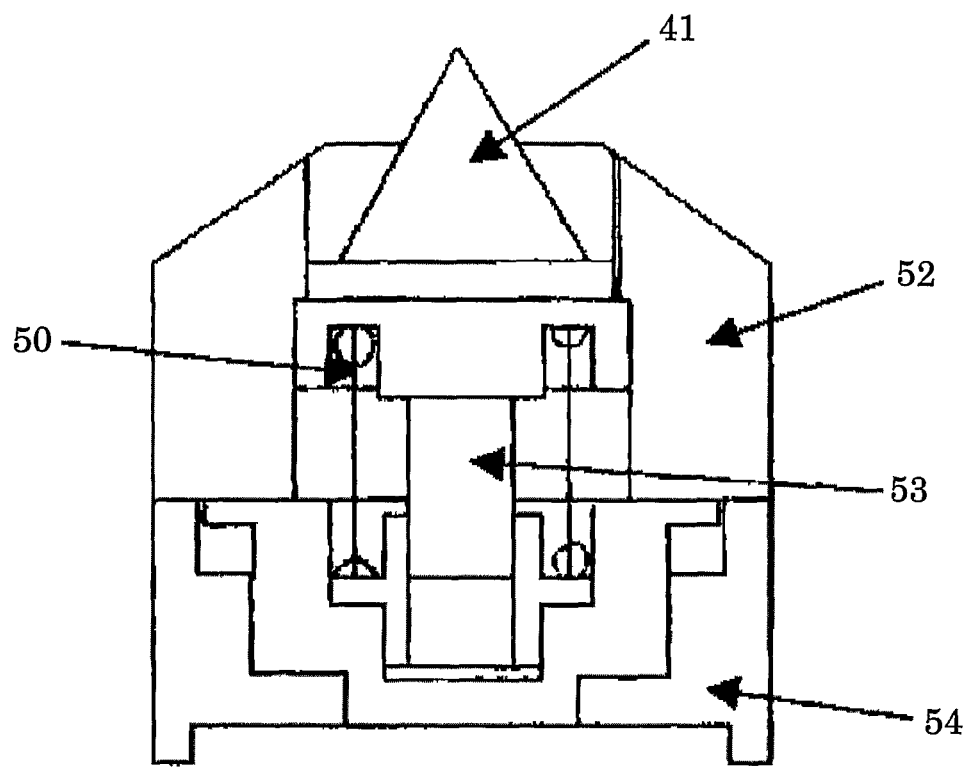
FIG. 6 is a section view of an electrode from the apparatus according to the present invention.

FIG. 6 shows an embodiment of the electrode 141 or 142 as a point-contact electrode 41. The electrode 41 is included in an insulating sleeve 52, e.g. made of polyether ether ketone (PEEK). The base of the electrode is securely bonded, e.g. by brazing, to a support 53 that co-operates with a spring 50. The spring 50 serves to press the electrode continuously against the measurement surface. Finally, the assembly comprising the electrode 41, the insulating sleeve 52, and the support 53 is itself carried by a pad 54. By way of example, the electrode is beveled in shape. This embodiment is particularly advantageous when an electrode is used to ensure electrical contact with the inner surface of the metal casing. Because of the particularly corrosive conditions inside the well, the metal casing becomes covered very quickly in a layer of rust which must be penetrated in order to ensure that the contact between the electrode and the casing is correct. The beveled shape is sufficiently sharp to pierce said layer.

The electrode is made of a composite material which is constituted by a fine layer of polycrystalline diamond compact (PDC) bonded to an amalgamated tungsten carbide support, enriched with about 7% cobalt. Typically, such an assembly is made by placing diamond powder (advantageously of the finest grain size) in a refractory metal mold generally of zirconium or of molybdenum. The shape of the mold determines the shape of the composite. Thereafter, a tungsten carbide support is placed over the diamond powder and the mold is sealed hermetically. The assembly is then placed in a press at a temperature of about 1400° C. and at a pressure of about 69,000 bars (1 MPsi), for a length of time that is too short to affect the diamond. Under such conditions, some of the cobalt diffuses into the diamond which, acting as a cement, gives rise to a total bond with the tungsten carbide base. Furthermore, the mixture of cobalt in the crystal lattice of the diamond makes the diamond electrically conductive. At the end of the process, a composite is thus obtained possessing a PDC layer that is doped with cobalt and that is of a thickness lying in the range 1 mm to 2 mm, together with a layer of cobalt-enriched tungsten carbide having a thickness lying in the range 4 mm to 10 mm.

The presence of cobalt in the diamond makes the diamond electrically conductive. As a result, the electrode makes it possible to combine electrical properties with the excellent mechanical properties of diamond. Similarly, tungsten could be associated with some other element in order to make the diamond electrically conductive. It is also possible to replace the tungsten carbide with some other support material, providing it presents the same compatibility with diamond powder and cobalt or some other element for making diamond conductive.

Additionally, the PDC electrode is covered in a layer of gold, e.g. deposited by physical vapor deposition (PVD) and having a thickness that is typically of the order of a few micrometers. It has been shown that the covering of gold adheres strongly and durably to the PDC. The layer of gold thus makes it possible significantly to increase the conductivity of the electrodes. PDC thus combines the excellent mechanical properties of diamond, in particular its hardness and its resistance both to shock and also to temperature (it remains chemically stable up to about 720° C.), with electrical properties due to cobalt doping, possibly assisted by a deposit of gold. This makes the electrodes particularly good at withstanding shock, temperature, and also corrosive media.

The electrode 141 or 142 in another embodiment can be a metallic spring bow in close contact with the inner surface of the casing with enough force to ensure electrical contact.

The electrode 141 or 142 in another embodiment can be a metallic caliper in close contact with the inner surface of the casing with enough force to ensure electrical contact.

The electrode 141 or 142 in another embodiment can be a metallic point with pressing means to ensure electrical contact with the inner surface of the casing.

The electrodes 151 and 152 can be any one of the electrodes here below presented either with the same electrodes or with different electrodes.

The electrode 151 or 152 can be a metallic bar hammered on the surface in the formation.

The electrode 151 or 152 can be a metallic cable going into the formation from the surface within some meters.

Figure 3:
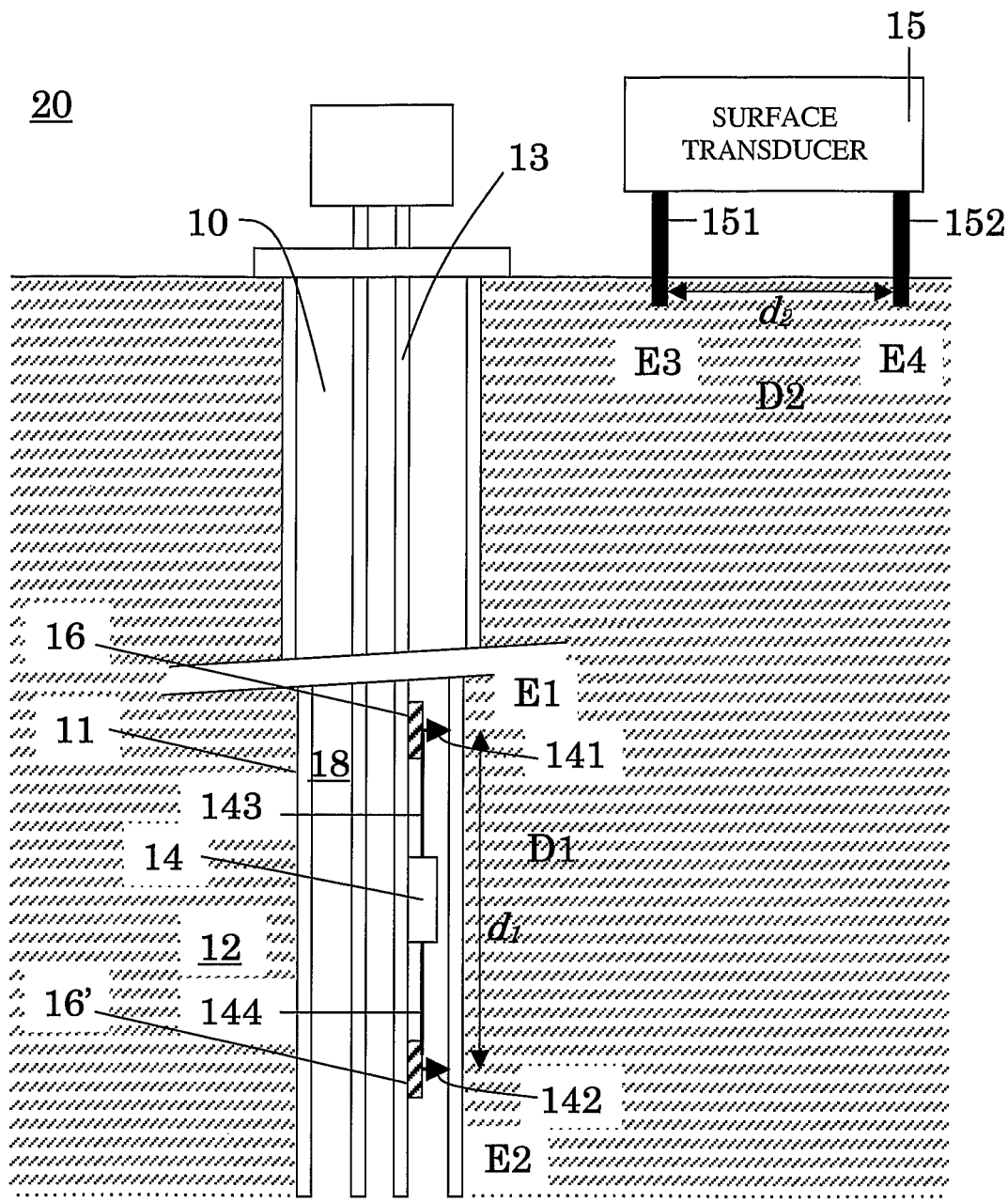
FIG. 3 shows a schematic diagram of an apparatus for wireless communication according to another embodiment of the present invention.

FIG. 3 illustrates a variation of the apparatus of FIG. 2. This time, the upper electrode 141 and the upon electrode 142 are not interdependent. The upper electrode 141 ensures contact with the casing at a pole E1 and the upon electrode 142 ensures contact with the casing at a pole E2. Preferably, the upper electrode 141 is insulated electrically from the tubing 13 with an insulator 16. Preferably, the upon electrode 142 is insulated electrically from the tubing 13 with an insulator 16'. The other additional embodiments remain the same. The transducer 14 is connected to the electrode 141 through a conductor cable 143 and to the electrode 142 through a conductor cable 144. The cables 143 and 144 are coated with an insulated jacket to avoid any current leakage through the tubing or the annular fluid. The effectiveness of the apparatus is proportional to the distance $d_1$ between E1 and E2. The poles E1 and E2 with the characterized distance $d_1$ will define the well dipole D1. The dipole D1 can extend over a considerable distance of the casing going from 10 feet (3 meters) to 3000 feet (1000 meters), preferably chosen in the range from 30 feet (10 meters) to 300 feet (100 meters). In case of highly conductive annular fluids, the casing can be coated with an electrically insulating deposit such as epoxy. This coating will significantly reduce the electrical losses into conductive annular fluids. In case of large spacing between the upper electrode 141 and the upon electrode 142, intermediate and insulating centralizers might have to be added along the tubing to avoid electrical contact with the casing due to tubing flexion or bending. Such electrical contacts would alter the communication. Rubber types insulating centralizers can be used. Also, the tubing can be coated with an electrically insulating deposit such as epoxy to avoid electrical contact with the casing due to tubing flexion or bending.

Figure 4:
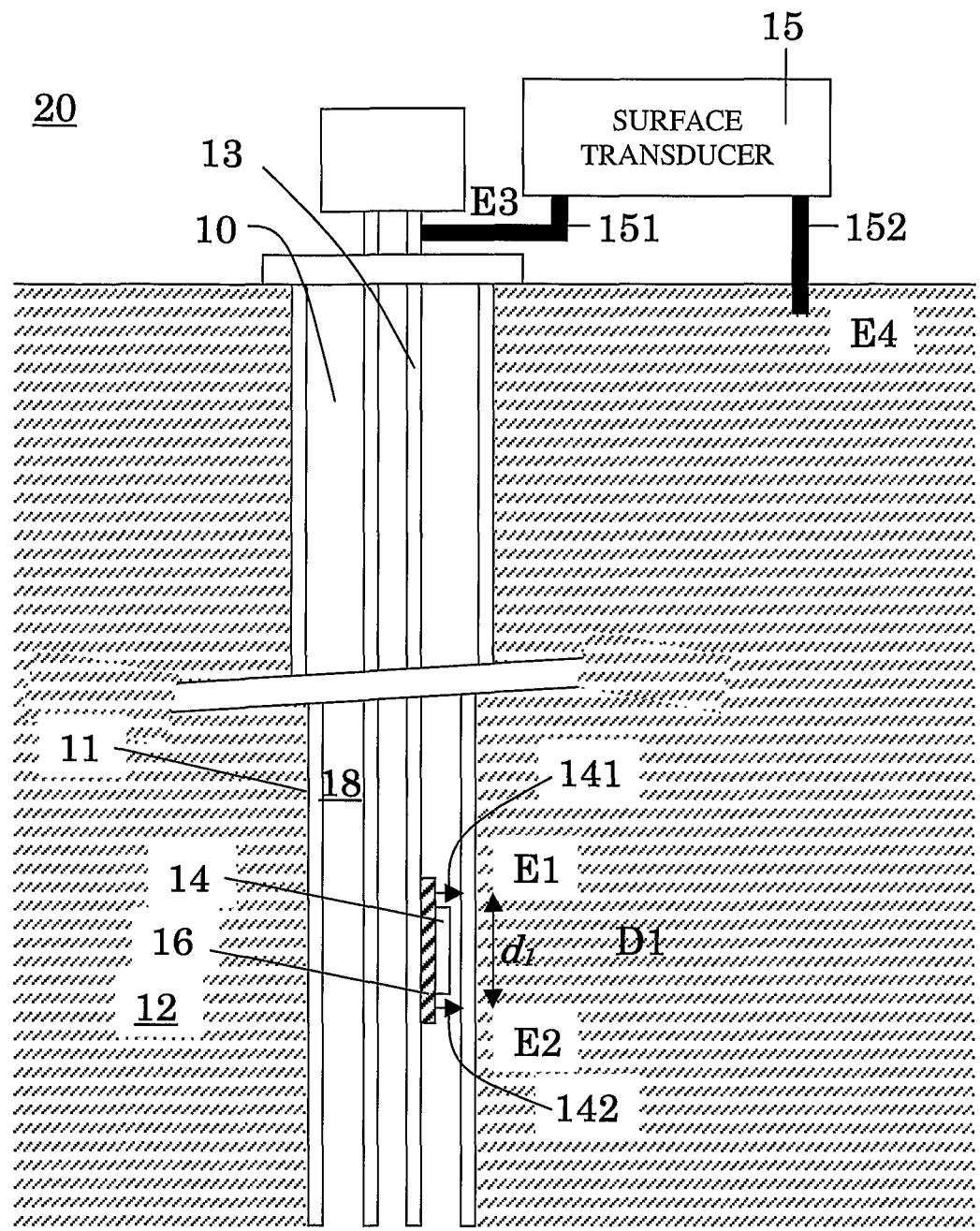
FIG. 4 shows a schematic diagram of an apparatus for wireless communication according to another embodiment of the present invention.

FIG. 4 illustrates another variation of the apparatus of FIG. 2. The second transducer 15, the surface transducer, is installed at the surface 20. But this time, the surface transducer has a first electrode 151 which ensures contact with the tubing at a pole E3 and a second electrode 152 which ensures contact with the formation at a pole E4. Other embodiments of FIGS. 2, 3 and 4 can be implemented without changing the scope of the invention.

Figure 5A:
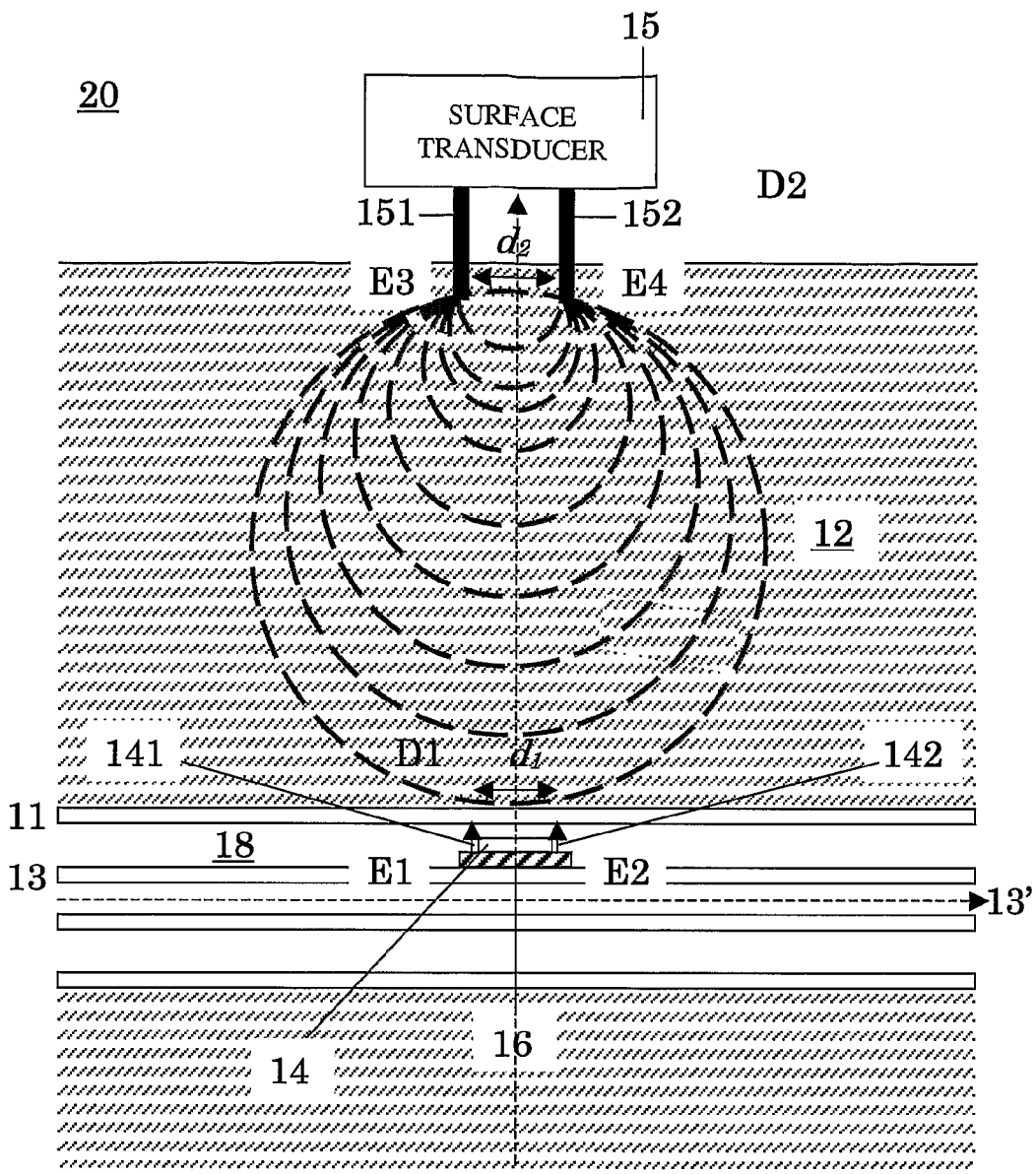
FIG. 5A shows a schematic diagram explaining the method of communication from the surface to the well for a horizontal well.
Figure 5B:
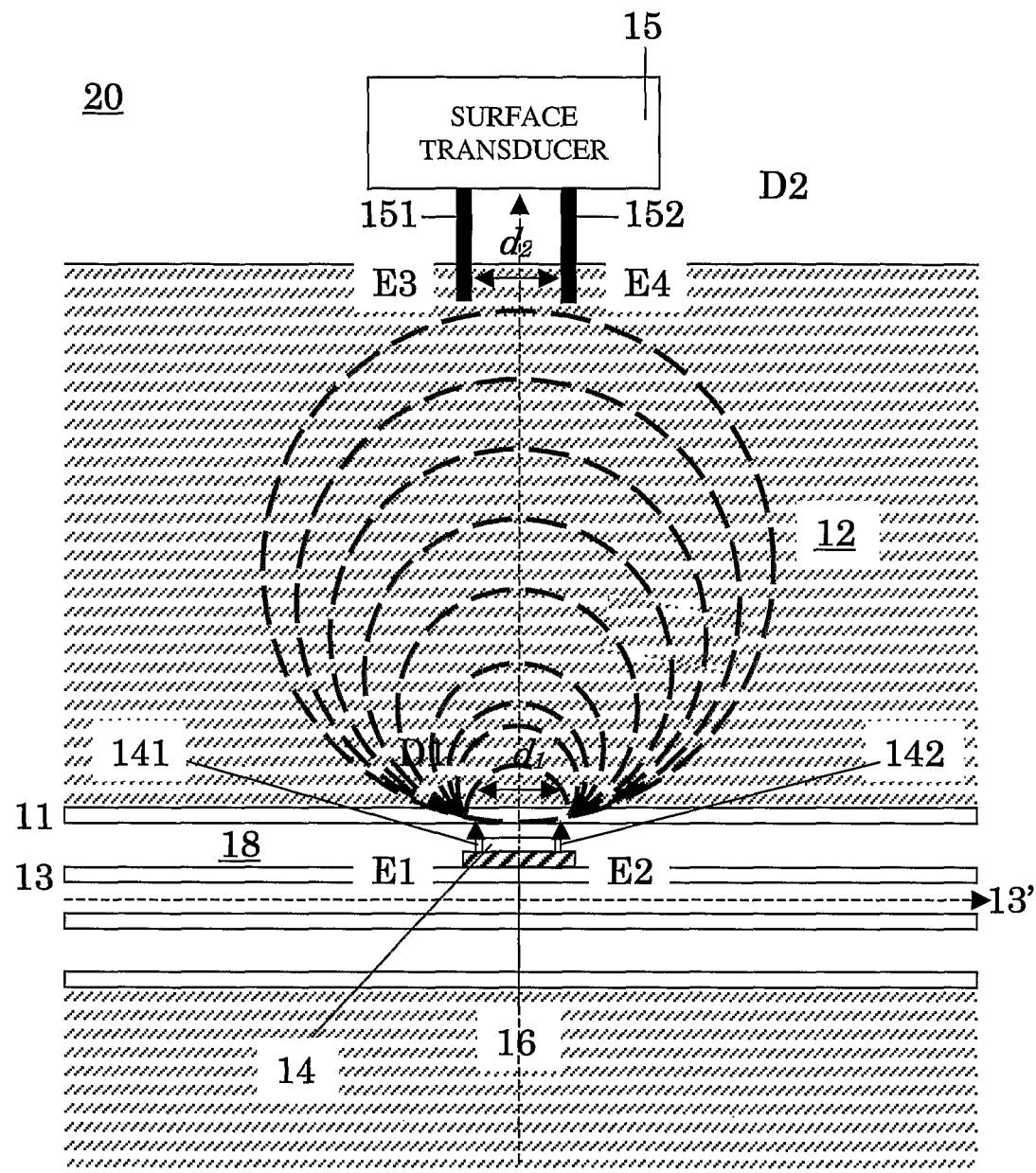
FIG. 5B shows a schematic diagram explaining the method of communication from the well to the surface for a horizontal well.

FIGS. 5A and 5B illustrate the apparatus according to FIG. 2, in a configuration of horizontal well. In FIG. 5A, the surface transducer is in mode transmitter and the well transducer is in mode receiver. In FIG. 5B, it is the opposite, the surface transducer is in mode receiver and the well transducer is in mode transmitter. The transmission and reception mode are presented in configuration of horizontal well, but can also be performed in configuration of vertical well or any inclination of the well. A casing axis 13' defines the horizontal axis and also x axis, perpendicular to the casing axis, the vertical axis defines the z axis, the y axis is defined such that (x, y, z) is a direct orthogonal trihedron.

In FIG. 5A, as receiver the two axially spaced point-contact electrodes 141 and 142 monitor the electric field that is parallel to the casing axis 13'. This electric-field component is tangential to the outer casing surface and hence continuous. Thus it will induce a considerable current in the casing; however, the voltage drop due to this current will correspond to the electric field multiplied with the axial distance $d_1$ of the electrodes.

Hence an electric field of 1 µV/m will generate between two electrodes 1 m apart a voltage of 1 µV, between two electrodes 10 m apart a voltage of 10 µV. Clearly, a longer distance between the two electrodes 141 and 142 will provide a proportionally stronger telemetry signal.

A realistic example illustrates the surface-to-downhole telemetry and provides an estimate for the expected signal strength. Assuming a land measurement with a simplified earth model as homogeneous body with a resistivity $\rho$=20 $\Omega$m, we consider a horizontal, cased well 500 m deep. At the surface of the earth the two electrodes 151 and 152 are placed into the ground and along the horizontal-well trajectory. The two electrodes are 100 m apart, so that the downhole telemetry station is in the middle.

We inject as telemetry-carrier signal a current of 10 A through electrode 151 and return it through the other electrode 152. Coulomb's law then gives the potential at the telemetry receiver:

$$\Phi(x, y, z) = 2\left[\frac{I}{4\pi\sigma r_1} - \frac{I}{4\pi\sigma r_2}\right] = \frac{I\rho}{2\pi}\left(\frac{1}{r_1} - \frac{1}{r_2}\right) \quad \text{(Equation 1)}$$

The factor 2 in front of the square bracket accounts for the insulating air half-space above the earth surface. The electric field at the receiver is the gradient of the potential:

$$\vec{E}(x, y, z) = -\vec{\nabla}\Phi(x, y, z) \quad \text{(Equation 2)}$$

$$= \frac{I\rho}{2\pi}\frac{1}{\sqrt{50^2 + 500^2}^3 \text{ m}^3}$$

$$\left[\begin{pmatrix} 50 \text{ m} \\ 0 \text{ m} \\ 500 \text{ m} \end{pmatrix} - \begin{pmatrix} -50 \text{ m} \\ 0 \text{ m} \\ 500 \text{ m} \end{pmatrix}\right]$$

$$\cong \frac{10 \text{ A} * 20 \text{ Vm/A}}{6.28318 * 500^3 \sqrt{1.01}^3 \text{ m}^3}\begin{pmatrix} 100 \text{ m} \\ 0 \\ 0 \end{pmatrix}$$

$$\cong \begin{pmatrix} 1 \\ 0 \\ 0 \end{pmatrix} 25.1 \,\mu\text{V/m}$$

Hence we expect to measure about 25 µV between two point-contact electrodes 141 and 142 separated by a distance $d_1$=1 m. The current density induced in the casing is therefore:

$$j = \sigma E \cong 10^6 \frac{\text{A}}{\text{Vm}} * 25.1 \frac{\mu\text{V}}{\text{m}} = 25.1 \frac{\text{A}}{\text{m}^2} \quad \text{(Equation 3)}$$

and the total current in the casing:

$$I = j\pi(r_{OD}^2 - r_{ID}^2) \cong 141.5 \text{ mA} \quad \text{(Equation 4)}$$

The amount of current is sufficient to be detected by ordinary electronics in the electronics package. The voltage created by the receiver can be continuous signal, if an information of activation has to be transmitted (close for signal and open for no signal, for example) or alternative signal with characterized frequency, if more complex data need to be transmitted. The characterized frequency can be few Hertz, 1 to 10 Hz typically.

In FIG. 5B, the point-contact electrodes 141 and 142 are equally used as transmitter. Here the electronics package must drive a large source current (preferably between 1 and 10 A or more than 10 A) through almost a short circuit. The effective source is spatially extended by the casing; it is crudely approximated by a horizontal electric point dipole D1 of source strength 10 Am with the potential:

$$\Phi(\vec{r}) = \vec{d} \cdot \vec{\nabla}\frac{1}{4\pi\sigma r} = -\frac{\vec{d}\cdot\vec{r}}{4\pi\sigma r^3} \quad \text{(Equation 5)}$$

The surface electrodes 151 and 152 as receivers will measure the potential difference as voltage:

$$U = \frac{2\rho}{4\pi(500 \text{ m})^3\sqrt{1.01^3}}\begin{pmatrix} 10 \text{ Am} \\ 0 \\ 0 \end{pmatrix} \cdot \quad \text{(Equation 6)}$$

$$\left[\begin{pmatrix} 50 \text{ m} \\ 0 \\ 500 \text{ m} \end{pmatrix} - \begin{pmatrix} -50 \text{ m} \\ 0 \\ 500 \text{ m} \end{pmatrix}\right]$$

$$\cong 25.1 \,\mu\text{V}$$

Due to reciprocity this signal is the same as the downward-telemetry signal. The electronics package has a source current of 10 A and the power consumption of the source through the 1 m casing section is: P=$I^2$R$\cong$100 $A^2$*177µ$\Omega$=17.7 mW. In the same way, the current created by the receiver can be continuous signal, if an information of confirmation of activation has to be transmitted or alternative signal with characterized frequency, if more complex data need to be transmitted. The characterized frequency can be few Hertz, 1 to 10 Hz typically.

Figure 5C:
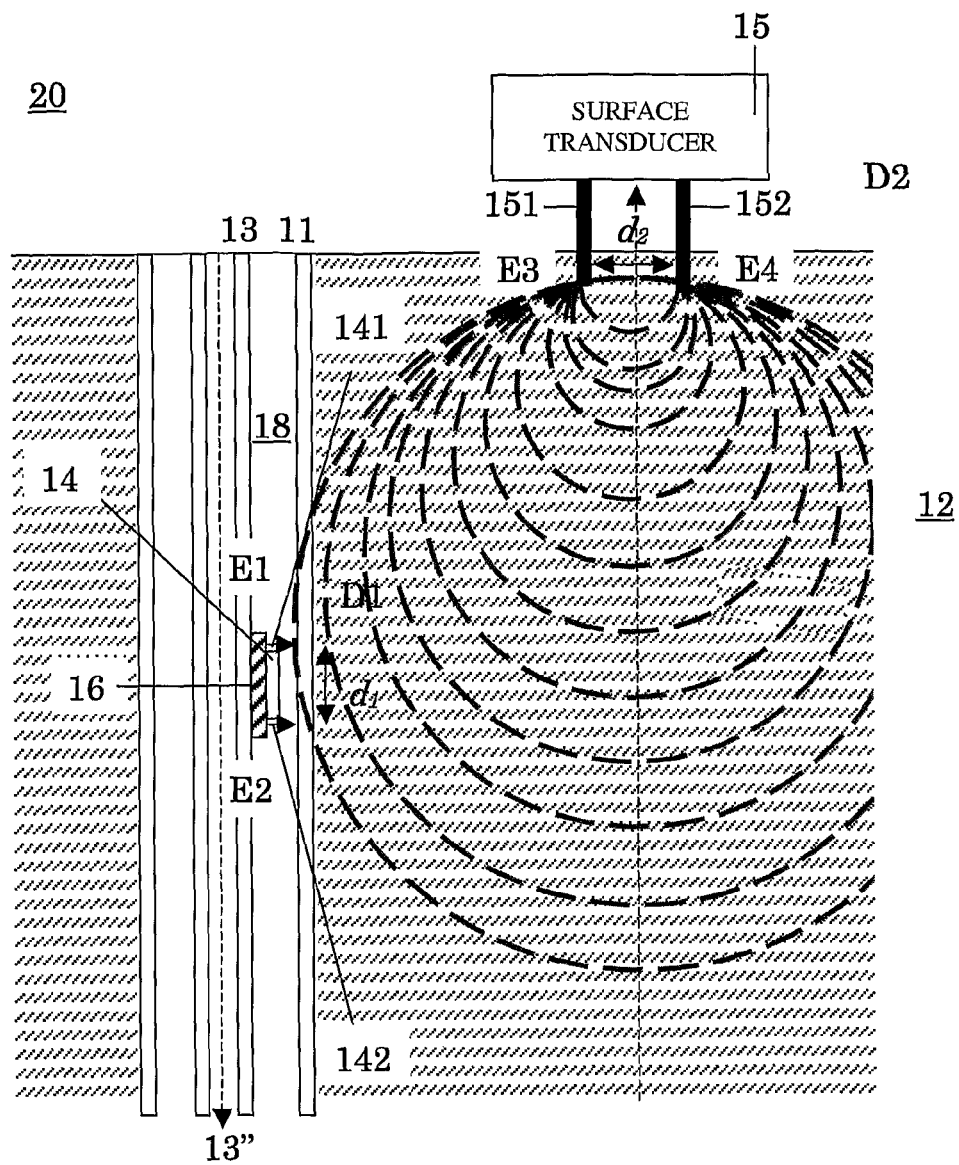
FIG. 5C shows a schematic diagram explaining the method of communication from the surface to the well for a vertical well.
Figure 5D:
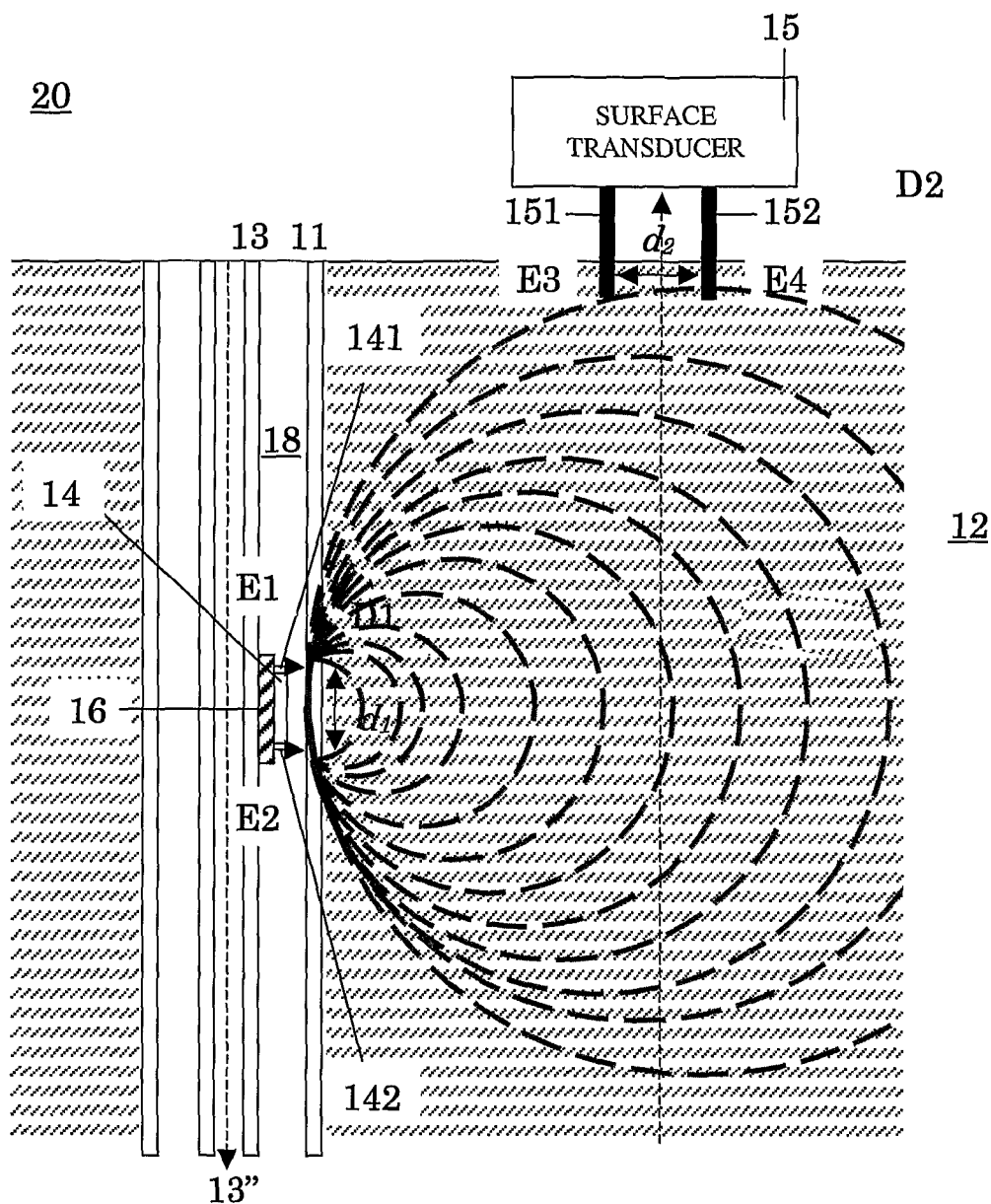
FIG. 5D shows a schematic diagram explaining the method of communication from the well to the surface for a vertical well.

FIGS. 5C and 5D illustrate the apparatus according to FIG. 2, in a configuration of vertical well. In FIG. 5C, the surface transducer is in mode transmitter and the well transducer is in mode receiver. In FIG. 5D, it is the opposite, the surface transducer is in mode receiver and the well transducer is in mode transmitter. The transmission and reception mode in configuration of vertical well works in the same way as described above.

Figure 7A:
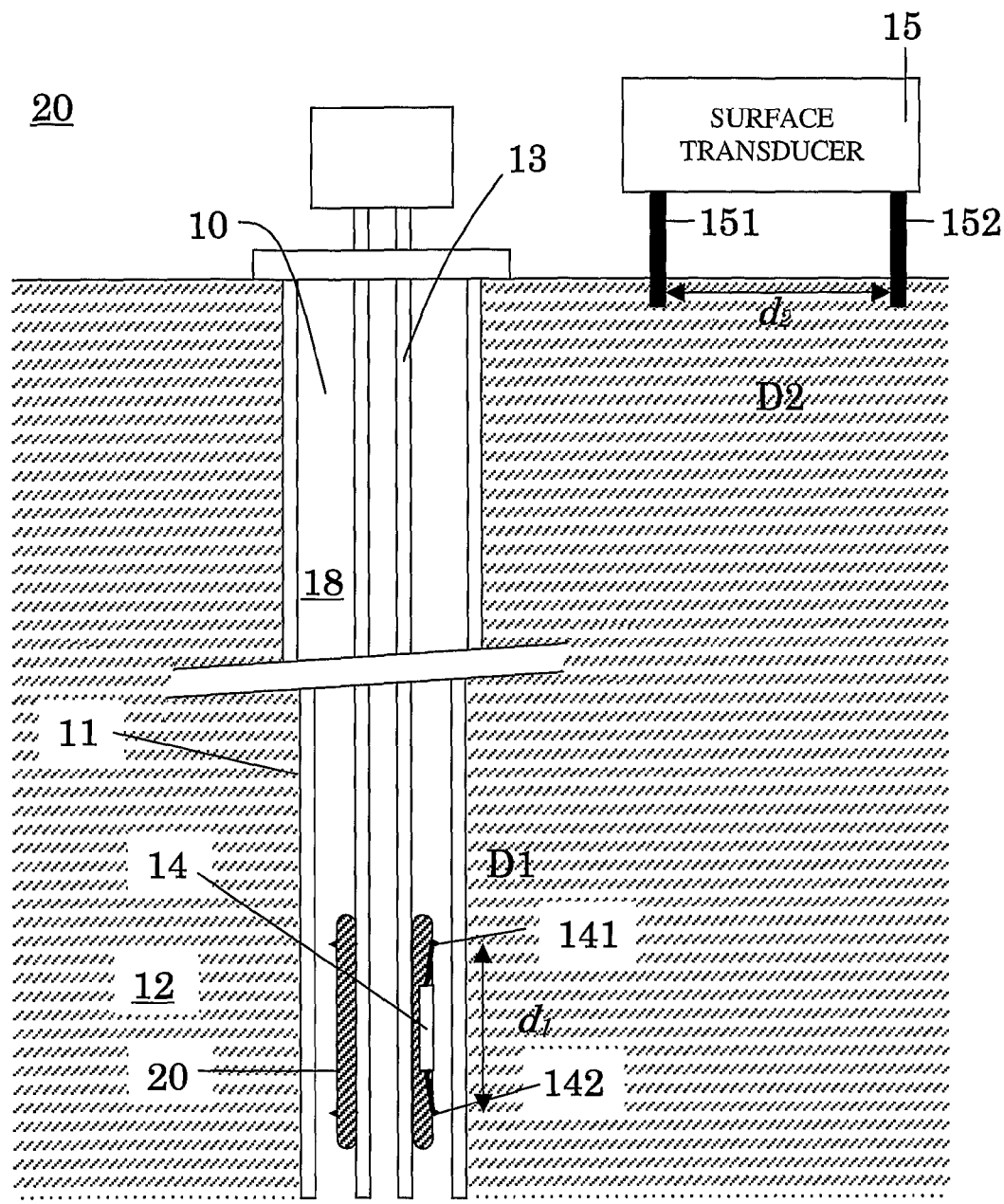
FIGS. 7A and 7B show a schematic diagram of an apparatus for wireless communication according to another embodiment of the present invention.
Figure 7B:
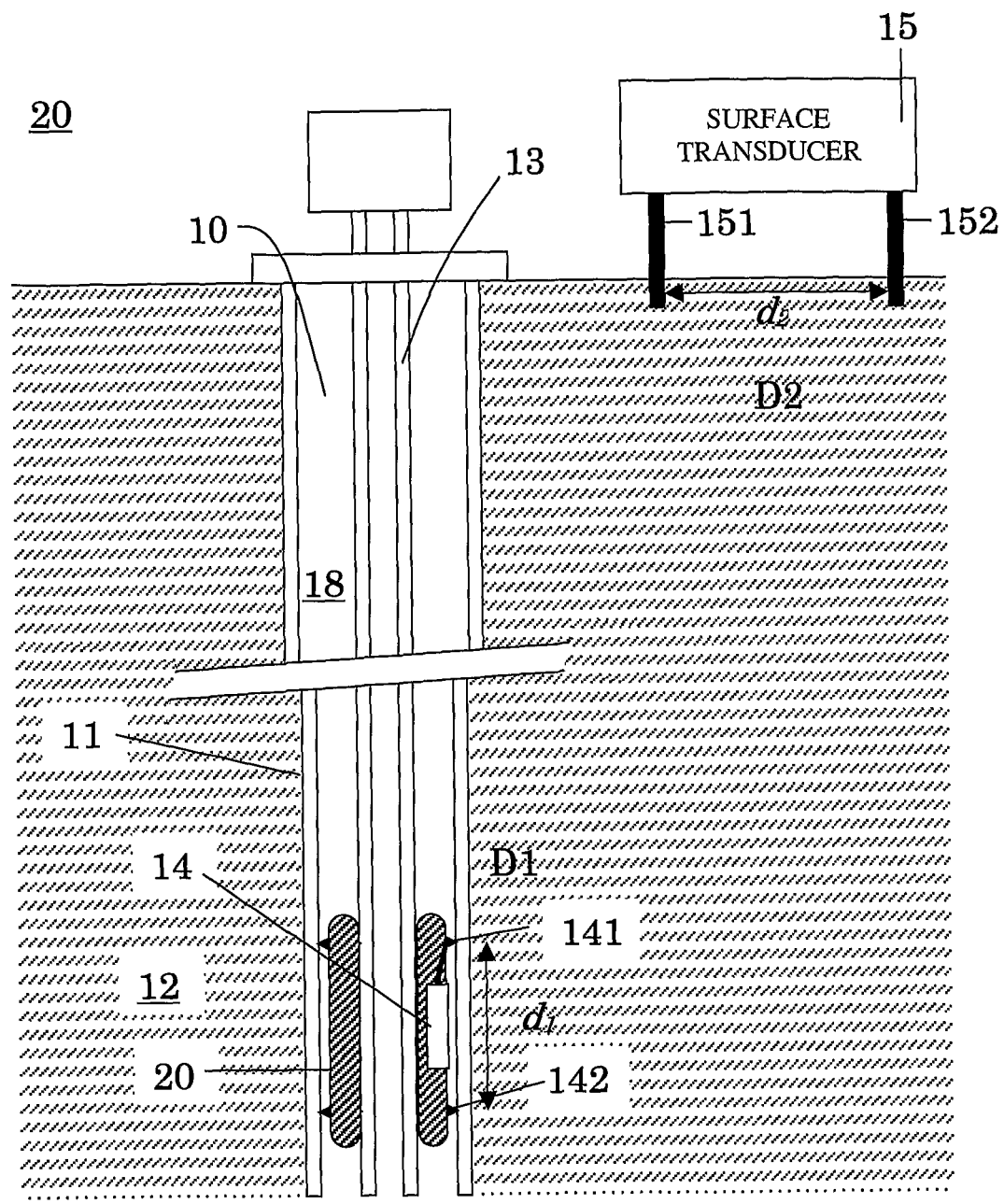
Figure 8A:
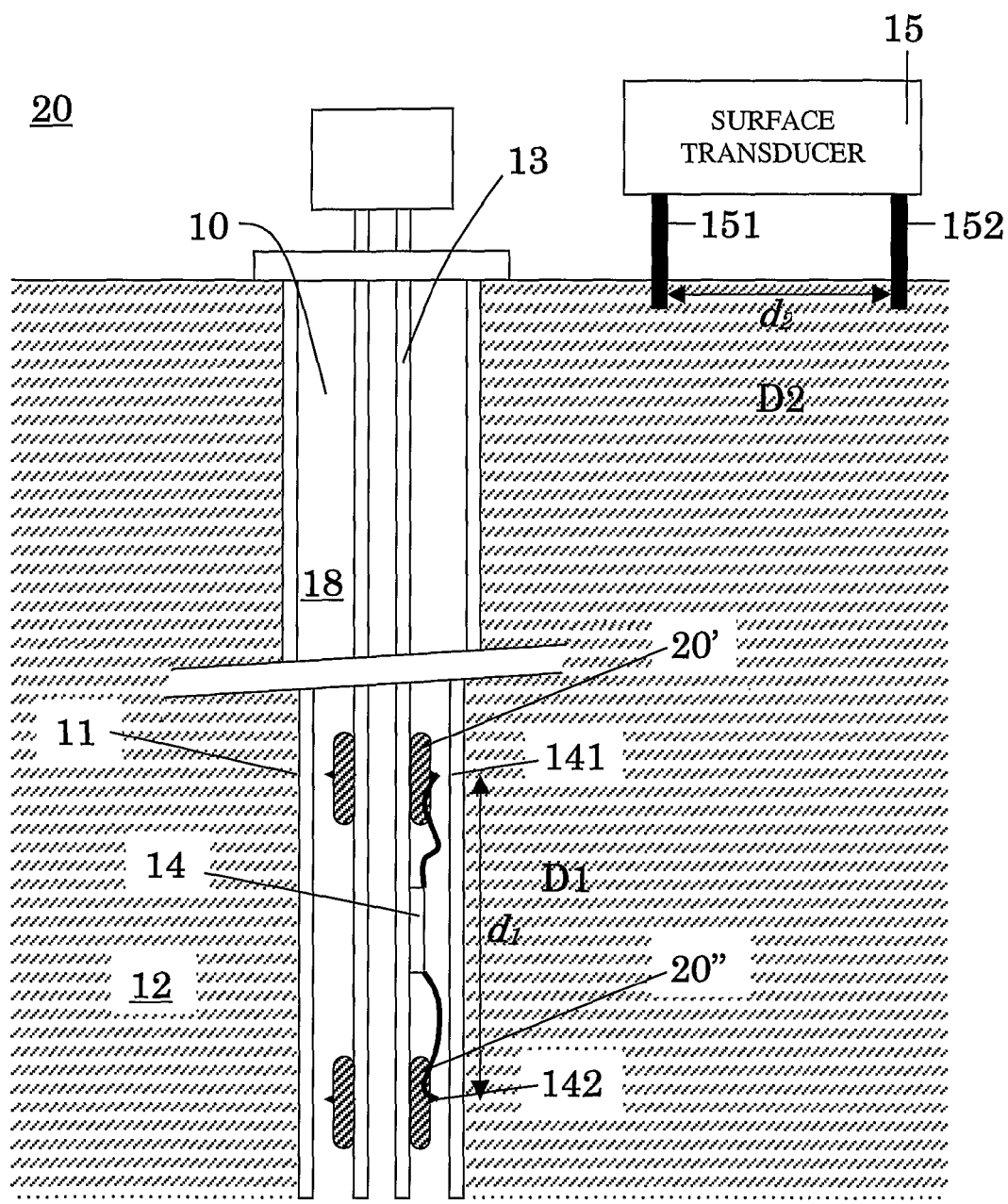
FIGS. 8A and 8B show a schematic diagram of an apparatus for wireless communication according to another embodiment of the present invention.
Figure 8B:
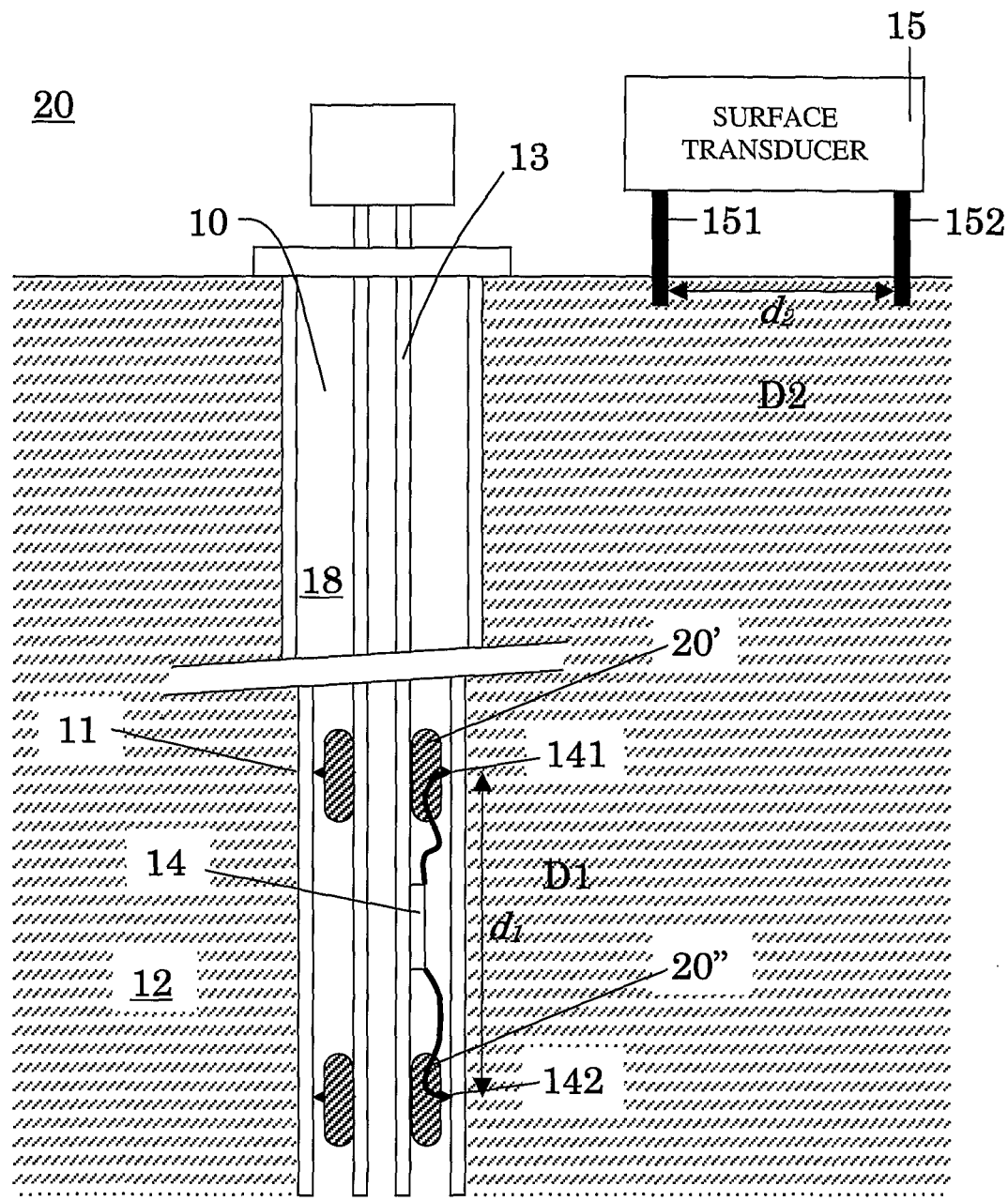

FIGS. 7A and 7B illustrate one embodiment of the apparatus according to FIG. 2 when using a long packer 20. FIGS. 8A and 8B illustrate one embodiment of the apparatus according to FIG. 3 when using a pair of short packer 20' and 20".

In FIG. 7A the long packer 20 is installed in deflated state around the tubing 13. At two (or more) axial positions on the outside of the packer a distance $d_1$ apart, point-contact electrodes 141 and 142 are mounted and wired to a suitable electronics package containing the transducer 14. The electronics package can be mounted anyway in the well or even on the packer 20. The wired connections are insulated with a jacket to avoid any current leakage through the tubing or the annular fluid. The point-contact electrodes may initially be covered by a puncture seal or insulating paint. This seal or paint will later be destroyed during deployment. The tubing equipped with the electrodes-packer 20 is lowered into a steel-cased well to its predetermined depth. Hence the packer is inflated to provide a hydraulically tight seal between the tubing outer wall and the casing inner wall.

Immediately prior to triggering the packer inflation, the point-contact electrodes 141 and 142 are set at a small voltage, and the current through the electrodes is monitored. The electronics package contains the required battery for voltage support and an ohmmeter, for example as monitoring system of the return current. As the electrodes are still protected by their seal or paint cover the current is small, corresponding to a high impedance between the electrodes 141 and 142.

In FIG. 7B, when the long packer 20 inflates and starts touching the casing inner wall the deployment pressure will puncture the seal or the insulating paint and force-push the point-contact electrodes 141 and 142 into the metal of the casing. This way, an electric contact between the point-contact electrodes and the conductive casing is established. The electric contact together with the high conductivity of the steel casing now provides very low impedance between the electrodes 141 and 142. The current between the electrodes increases accordingly, thus indicating the successful deployment of the long packer 20 at the downhole level.

It is not possible in general to provide reliable values for the impedance prior to deployment, considering the unknown state of the casing inner-wall surface and the wide range of electric properties of the annular fluids, be they salt or brackish water or a more or less well separated oil-water mixture. It seems reasonable to assume that the impedance between the point-contact electrodes 141 and 142 is several hundred mΩ to a few Ω.

As example for the impedance after deployment, considering a generic seven inches (18 cm) casing with an inner diameter of 6.154 inches (15.63 cm). Assuming a steel resistivity of $\rho=100\ \mu\Omega\cdot cm$ and a distance of $d_1=1$ m the resistance of this casing section is approximately:

$$R = \frac{\rho l}{A} = \frac{\rho l}{\pi(r_{OD}^2 - r_{ID}^2)} \cong 177\ \mu\Omega \qquad \text{(Equation 7)}$$

This impedance is far less than any impedance of the fluids in the annular space between the tubing and the casing. Thus even a crude ohmmeter can easily identify a successful packer deployment using the point-contract electrodes. The electronics package has therefore general components with no special requirements on precision.

When the long packer 20 is deployed correctly with the point-contact electrodes 141 and 142 in place the transducer 14 can be activated to begin the reception or transmission mode accordingly to FIG. 5A or 5B.

In FIG. 8A a pair of short packer 20' and 20" are installed in deflated state around the tubing 13. At two (or more) axial positions on the outside of the packers 20' and 20" a distance $d_1$ apart, point-contact electrodes 141 and 142 are mounted and wired to a suitable electronics package containing the transducer 14. The electronics package can be mounted anyway in the well. The wired connections are insulated with a jacket to avoid any current leakage through the tubing or the annular fluid. The other characteristics are similar to the long packer 20.

In the same way, in FIG. 8B, when the packers 20' and 20" inflate and start touching the casing inner wall the deployment pressure will puncture the seal or the insulating paint and force-push the point-contact electrodes 141 and 142 into the metal of the casing. When the both packers 20' and 20" are deployed correctly with the point-contact electrodes 141 and 142 in place the transducer 14 can be activated to begin the reception or transmission mode accordingly to FIG. 5A or 5B.

According to the invention, the long packer 20 or the both short packers 20' and 20" can be instrumented packers, which mean that the packers can contain measurement sensors such instrumented packers are disclosed in patent application US2003094282. The measurement sensor is located on the packer surface or in the packer. The measurement sensor can be deployed when packer is deflated or can be deployed when packer is inflated.

In another aspect of the invention, the apparatus according to FIG. 2 can be deployed in the well as a network of several apparatus. Effectively, when the well has a special architecture such as multi-wells or deep well; it is difficult to communicate from downhole to the surface with only one apparatus. As see above, for a 500 m deep well the electronics package of the apparatus of FIG. 2 has to have a source current of 10 A. Nevertheless, it is possible to create a network of several apparatus every one containing a transducer 14 as disclosed in FIG. 2.

Figure 9:
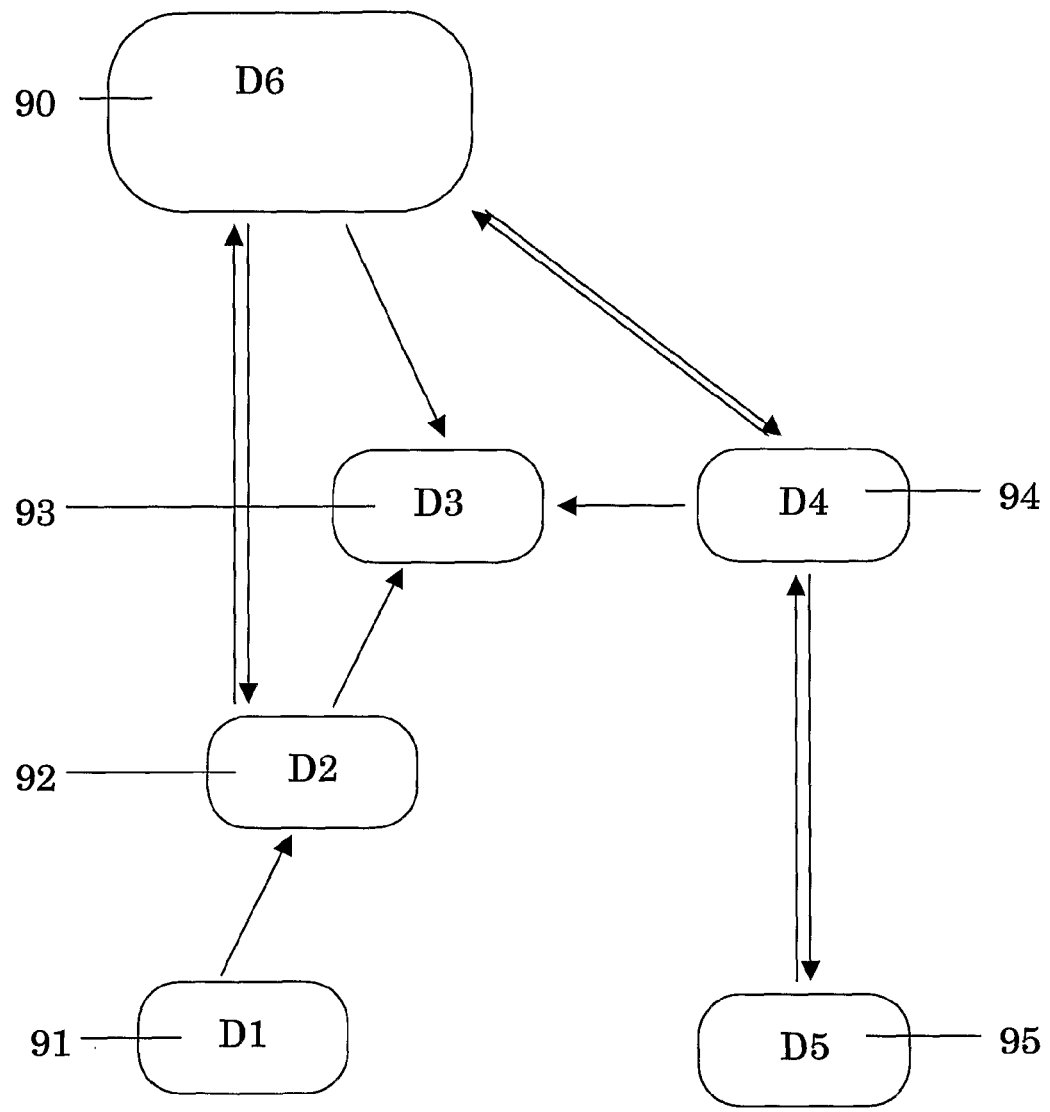
FIG. 9 shows a network of apparatus according to the invention.

In FIG. 9, an apparatus containing a transducer and two electrodes contacting a casing is represented by a dipole Di with i varying between 1 and 6. The dipole Di can be a transmission dipole, a reception dipole or both reception/transmission dipole. Each dipole is located in the well at defined location. At an example of configuration in a multi-well, D1, D2 and D3 are located in a first well, D4 and D5 are located in a second well and D6 is located at the surface. In the first well, D1 is a transmission dipole which is connected to a measurement sensor 91, D2 is a reception/transmission dipole which is connected to a sub-unit 92 with measurement sensors, D3 is a reception dipole which is connected to a control valve 93. In the second well, D4 is a reception/transmission dipole which is connected to a sub-unit 94 with a control valve, D5 is a reception/transmission dipole which is connected to sensors 95. On the surface the dipole D6 is a reception/transmission dipole which is connected to a master control unit 90. As an example of communication of instructions, the sensor 91 measures specific parameters which are communicated to the master control unit 90 via dipoles D1 to D2 and D2 to D6. The master control unit 90 compiles measurements from sensor 91 and sends an order to the control valve 93 via directly dipole D6 to D3 or via dipoles D6 to D2 and D2 to D3. As another example of communication of instructions, the sensors 95 measure specific parameters which are communicated to the sub-unit 94 via dipole D5 to D4. The sub-unit 94 sends an order to its control valve and to the control valve 93 via dipole D4 to D3. And also the sub-unit 94 informs master control unit 90 via dipole D4 to D6 of the orders communicated to control valves.

For the communication with the various elements of the network, a protocol has to be defined. Conventional protocol can be used, for example be defined for each element of the network an address and when communicating with other elements transmitting address and receipting address are given before beginning the information transfer.

Various other elements can be added to the network system according to FIG. 9. In another embodiment, the network can be generalized to inter-communicate with other wireless communication protocols, such as ultrasonic wave transmitter. A control unit and two transducers will inter-communicate: a dipole transducer for communication with dipole transducers, a ultrasonic transducer for communication with ultrasonic transducers and the control unit for exchanging information between both transducers.

In another aspect of the invention, because the communication is based on electromagnetic communication, various properties of the well and the surrounding formation have to be defined. Especially, because for two apparatus as shown in FIG. 2 or for a network of apparatus as shown in FIG. 9, the conductivity pathway from one dipole to the other has to be characterized. In this way, two important regions have to be investigated: one will be the well, and more particularly the well architecture, because well contains conductive or insulating materials, which can produce short circuits in the pathway; second will be the formation, and more particularly the conductivity of the pathway to the surface.

Figure 10:
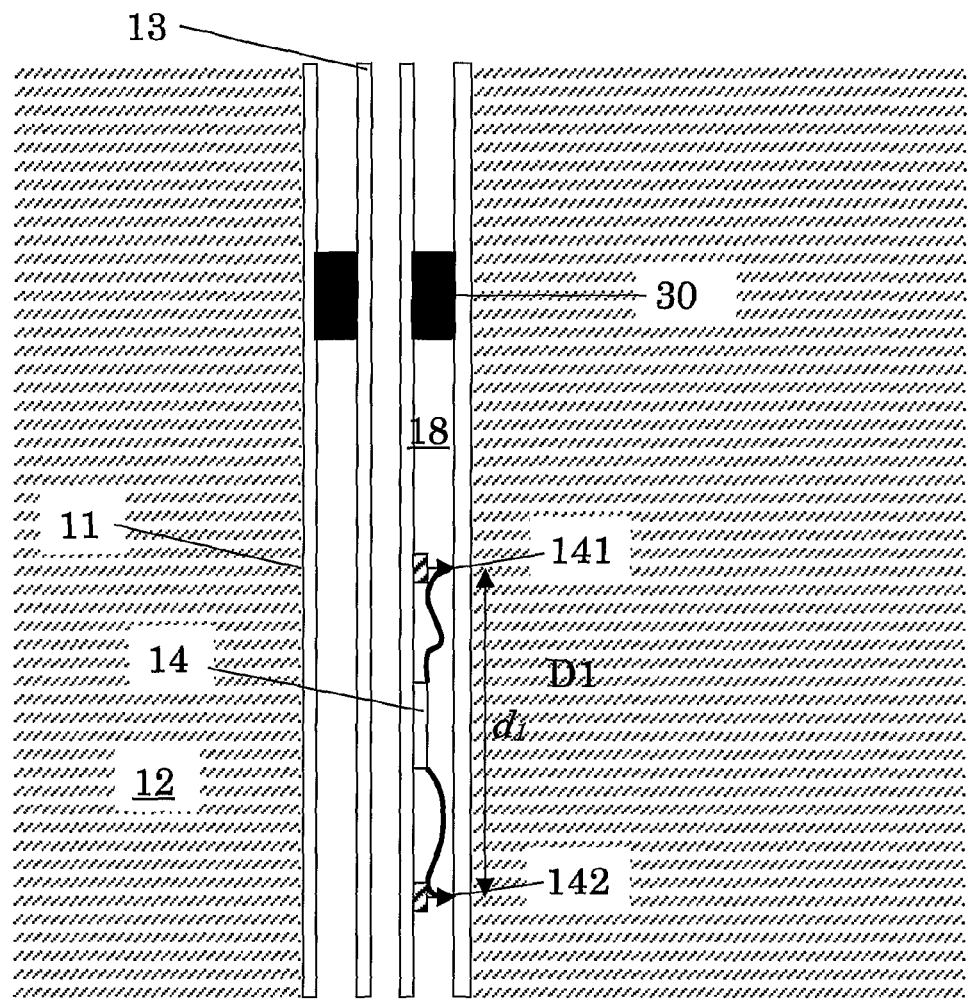
FIG. 10 shows an example of architecture of the well using apparatus according to the invention.

For the first part, architecture of the well has to be controlled to know where it is suitable to place a pair of electrodes. In FIG. 10, a configuration of a pair of electrodes is shown in a wrong configuration. The well 10 comprises a tubing 13 and a casing 11 surrounding formation 12. An annular 18 is formed between the casing and the tubing, which is filled with a conductive annular fluid. The well transducer 14 is connected through two insulated cables respectively to the electrodes 141 and 142. A conductive element 30 is located near the electrode 141 and connects the tubing 13 to the casing 11. With this configuration, a short circuit is realized through the conductive element 30 and the electrical signal emitted by the transducer will be attenuated. If this configuration has to be used, the electrode 141 has to be located on the conductive element 30 and preferably has to be insulated from the tubing 13.

For the second part, the conductivity of the pathway from a well dipole to a surface dipole has to be characterized. A method to determine this conductivity pathway can be done using Schumann resonances.

The proposed method will monitor the Schumann-resonance spectrum at the earth surface as calibrating signal. The amplitudes of the various Schumann-resonance frequencies serve to normalize the signals within the geologic formation.

Inside the earth these electromagnetic signals dissipate more or less rapidly. Their exponential decay is described as skin effect, where the skin depth $\delta$ is a function of frequency and conductivity of the surrounding medium. The Schumann-resonance amplitudes are measured for the different resonance frequencies as function of vertical depth and normalized by the surface-signal amplitudes. The exponential decay length for any one frequency is monitored as a function of the vertical depth and fit to an exponential or a series of successive exponentials. The resulting exponents constitute the skin depth that determines the formation conductivity averaged over the interval of the exponential fit. According to the invention, a method and an apparatus are proposed to measure the resulting exponents of the Schumann-resonance decay profile.

In a preferred embodiment, the method monitors at least two different resonance frequencies as a function of the vertical depth and compares them. Their ratio will be an exponential that can be inverted and together with the known frequencies yields the desired average formation conductivity.

Figure 11:
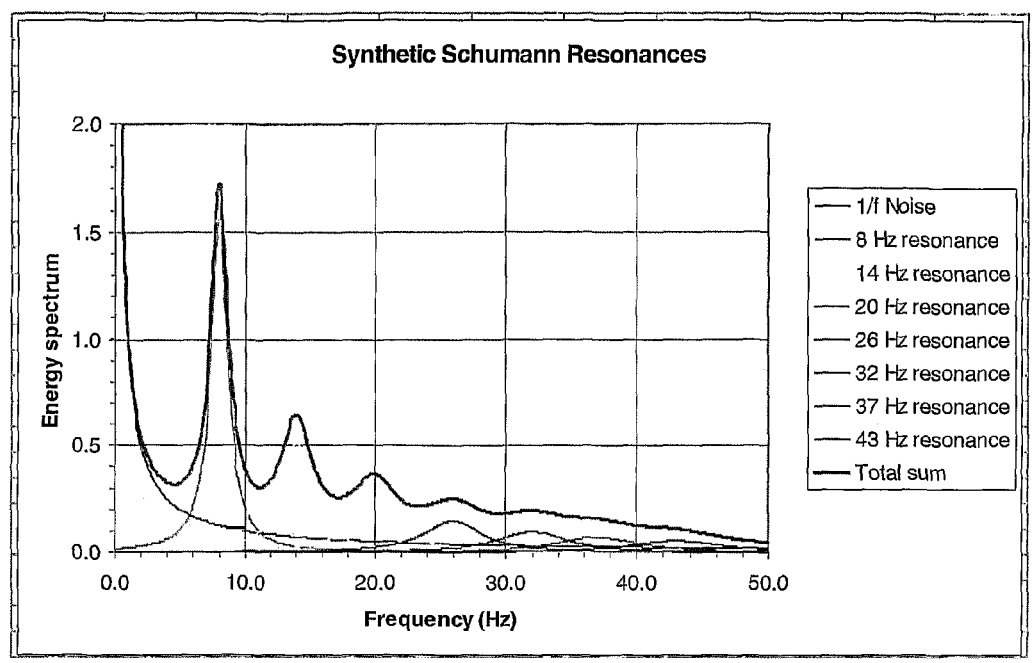
FIG. 11 is a graphic of the Schumann-resonances as superposition of individual Breit-Wigner-resonance peaks with 1/f background-noise spectrum.

Schumann resonances are electromagnetic signals in the earth atmosphere that are routinely monitored. Schumann resonances are produced in the earth atmosphere at very low frequencies around 8, 14, 20, 26, 32, 37 and 43 Hz, roughly following the spherical-harmonics relationship $f=5.8\sqrt{l(l+1)}$ Hz described, for example, in J. D. Jackson "*Classical Electrodynamics*", J. Wiley & Sons, 1975. These resonances vary slightly in frequency and considerably in amplitude over time. They have been surprisingly and unknowingly observed during previous field tests of wireless telemetry systems of the applicant. They have previously only been identified in prior art as sources of noise in other low-frequency surface-geophysical surveys. FIG. 11 illustrates the Schumann-resonance spectrum as superposition of individual Breit-Wigner-resonance peaks with energy:

$$E(f) = \frac{1}{(f - f_0)^2 + (0.1 * f_0)^2} \qquad \text{(Equation 8)}$$

where the peak width (decay rate) is assumed as 10% of the resonance frequency, corresponding to a factor of quality Q of 10. The typically expected 1/f background-noise is added to the spectrum in FIG. 11.

Figure 12:
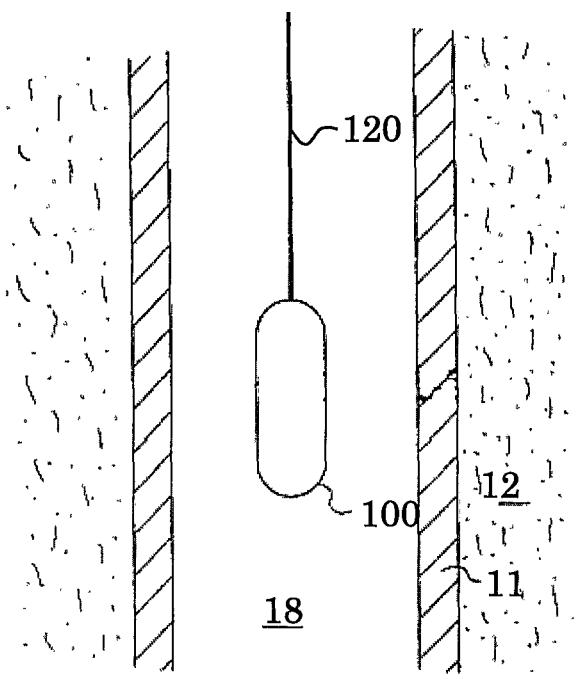
FIG. 12 is a schematic view of a measurement tool using Schumann resonances.

The method according to the invention monitors these Schumann resonances in a borehole as function of vertical depth with a wireline interrogating tool 100 suspended to a wireline cable 120 (FIG. 12). This measurement assumes a vertically even dissipation of the signals and thus permits to interpret the measurement as vertical conductivity profile.

Generally, the Schumann resonances use the earth surface as conductive boundary. Hence, the electric field will be close to perpendicular and the magnetic field close to tangential to the earth surface. Consequently, vertical electric-dipole (voltage-gap) and horizontal magnetic-dipole receivers will be best suited as detectors for Schumann resonances.

The Schumann resonances must be monitored at the surface of a survey site. The frequency spectrum and the relative amplitudes for the different resonances measured at the surface serve as calibration to normalize the downhole measurements.

At the same time, the downhole measurement conditions will differ from the surface conditions. First, the downhole sensor configuration may differ from the surface monitors. Secondly, the downhole measurement may be performed in casing where the signal attenuation across the casing wall becomes a function of frequency. Therefore, the surface monitor only serves as good-quality resonance-frequency calibration and first-step amplitude calibration.

The amplitudes for the entire frequency spectrum are measured as a function of the true vertical depth. Assuming a simple, layered formation with only vertical conductivity variations, the skin depth is a function of depth as well as frequency:

$$\delta(f,z) = \sqrt{\frac{2}{\omega\mu\sigma(z)}} = \frac{10^4}{2\pi\sqrt{10f\sigma(z)}} \cong \frac{503.3\text{ m}}{\sqrt{f\sigma(z)}} \quad \text{(Equation 9)}$$

where the frequency f is implied in Hz and the conductivity σ(z) in S/m.

Figure 13:
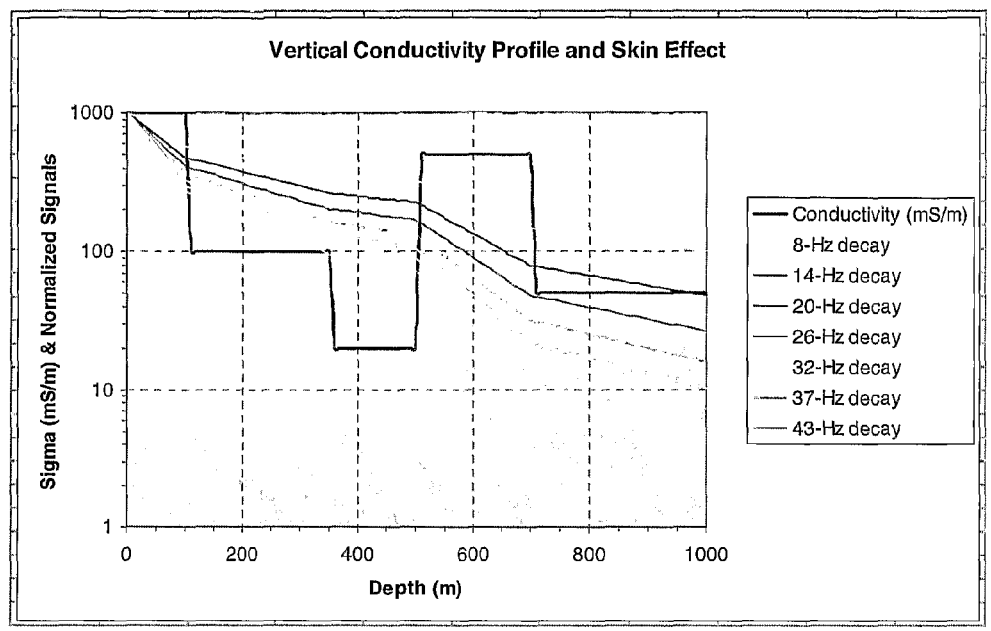
FIG. 13 is a graphic of vertical conductivity profile and signal decay for various frequencies.

The electromagnetic signals at the individual frequencies decay exponentially with rates that depend only on the vertical conductivity distribution and the frequency, the electromagnetic signal is:

$$U(f,z) = \frac{U(f,z_0)}{\bar{\delta}}\int_{z_0}^{z} dz' e^{-z'/\delta(f,z')} \quad \text{(Equation 10)}$$
$$= \frac{U(f,z_0)\sqrt{f\bar{\sigma}}}{503.3\text{ m}}\int_{z_0}^{z} dz' e^{-z'\sqrt{f\sigma(z')}/503.3\text{ m}}$$

with an effective average background conductivity $\bar{\sigma}$. For this depth profile, we assume that the Schumann-resonance spectrum is measured at some initial reference depth $z_0$ to provide an absolute amplitude calibration. We also assume that inside the well the conditions do not change: the well is either cased throughout or open. If a log is run past a casing shoe, the reference calibration must be repeated for the different zones. FIG. 13 shows a hypothetical conductivity profile and the measurement response (Equation 10) for the seven Schumann resonance frequencies.

The vertical conductivity profile σ(z) is extracted from the measured signal at any single resonance frequency by isolating the integral $$\frac{503.3\text{ m}U(f,z)}{\sqrt{f\bar{\sigma}}U(f,z_0)} = \int_{z_0}^{z} dz' e^{-z'\sqrt{f\sigma(z')}/503.3\text{ m}} \quad \text{(Equation 11)}$$

and differentiating it with respect to the depth z:

$$\frac{\partial}{\partial z}\left(\frac{503.3\text{ m}U(f,z)}{\sqrt{f\bar{\sigma}}U(f,z_0)}\right) = e^{-z\sqrt{f\sigma(z)}/503.3\text{ m}} \quad \text{(Equation 12)}$$

$$\sigma(z) = \frac{1}{f}\left(\frac{503.3\text{ m}}{z}\log\left(\frac{\partial}{\partial z}\left(\frac{503.3\text{ m}U(f,z)}{\sqrt{f\bar{\sigma}}U(f,z_0)}\right)\right)\right)^2 \quad \text{(Equation 13)}$$
$$= \frac{503.3^2\text{ m}^2}{fz^2}\left(\log*\left(\frac{\partial U(f,z)}{U_0\partial z}\right)\right)^2$$

This conductivity inversion is the simplest and most straightforward method. The calibration measurement $U(f, z_0)$ enters as normalization that is cancelled in the differentiation.

The universal normalization $U_0$ only serves to provide correct physical units. The presence of this universal signal normalization indicates that the conductivity log from the Schumann resonances may require a calibration shift on the logarithmic conductivity scale to match with some known formation conductivity.

For the purpose of comprehensive conductivity profiling, it will be advantageous to monitor several Schumann-resonance frequencies at the same time. It may be preferable to monitor the ratio of two Schumann resonances as function of depth to eliminate the universal normalization constant $U_0$. We assume negligible conductivity dispersion in the rock between any two Schumann-resonance frequencies so that σ(z) is independent of frequency.

$$\frac{U(f_1,z)}{U(f_2,z)} = \frac{\sqrt{f_1}}{\sqrt{f_2}}\frac{U(f_1,z_0)}{U(f_1,z_0)}\frac{\int_{z_0}^{z} dz' e^{-z'\sqrt{f_1\sigma(z')}/503.3\text{ m}}}{\int_{z_0}^{z} dz' e^{-z'\sqrt{f_2\sigma(z')}/503.3\text{ m}}} \quad \text{(Equation 14)}$$

Again, the integrals are isolated $$\sqrt{\frac{f_2}{f_1}}\frac{U(f_1,z)}{U(f_2,z)}\frac{U(f_2,z_0)}{U(f_1,z_0)} = \frac{\int_{z_0}^{z} dz' e^{-z'\sqrt{f_1\sigma(z')}/503.3\text{ m}}}{\int_{z_0}^{z} dz' e^{-z'\sqrt{f_2\sigma(z')}/503.3\text{ m}}} \quad \text{(Equation 15)}$$

and differentiated with respect to the depth z. In fact, it may prove more convenient to compute the derivative of the logarithm of the ratio to outright eliminate the depth-independent normalization factors:

$$\frac{\partial}{\partial z}\log\left(\sqrt{\frac{f_2}{f_1}}\frac{U(f_1,z)}{U(f_2,z)}\frac{U(f_2,z_0)}{U(f_1,z_0)}\right) = \frac{\partial}{\partial z}\log\left(\frac{U(f_1,z)}{U(f_2,z)}\right)$$
$$= \frac{\partial}{\partial z}(\log U(f_1,z) - \log U(f_2,z))$$

or explicitly:

$$\frac{1}{U(f_1,z)}\frac{\partial U(f_1,z)}{\partial z} - \frac{1}{U(f_2,z)}\frac{\partial U(f_2,z)}{\partial z} =$$
$$\frac{e^{-z\sqrt{f_1\sigma(z')}/503.3\text{ m}}}{\int_{z_0}^{z} dz' e^{-z'\sqrt{f_1\sigma(z')}/503.3\text{ m}}} - \frac{e^{-z\sqrt{f_2\sigma(z')}/503.3\text{ m}}}{\int_{z_0}^{z} dz' e^{-z'\sqrt{f_2\sigma(z')}/503.3\text{ m}}}$$

The apparatus according to the invention is an interrogating tool as disclosed in FIG. 12 and containing a measurement sensors package for detecting electromagnetic waves: electric and magnetic fields in a natural borehole or preferably in a cased hole.

Receivers for the Schumann-resonance monitoring are the wireless-telemetry voltage-gap receivers.

The continuity of the tangential electric-field component across conductivity boundaries, even in the presence of a cased well, prefers the electric field component parallel to the casing axis. However, very little quantitative data about the sensitivity of ELF electrical antennas are available, so that preferably, appropriate test and noise assessment measurements have to be done using the voltage gap of an existing telemetry setup as receiver.

Alternately, in cased-hole application, the electric-field receiver could consist of single electrodes clamped inside the casing wall to measure the potential difference at casing level and reduce any spurious effects due to the presence of completion fluids. Those electrodes have been described above, especially in FIG. 2.

The apparatus according to the invention further comprises at the surface of the well, for example in a survey site, another measurement sensors package for detecting electromagnetic waves on the surface: frequency and amplitudes of electric and magnetic fields for calibration of measurements downhole with the interrogating tool. The measurement sensors are conventional electric field and magnetic field sensors as disclosed or others useable on surface.

Schumann-resonance monitoring will work best on land or in shallow water depths. The conductive ocean water of ~0.3 $\Omega$m will dissipate the Schumann-resonance signals in deep waters. At the same time, land jobs tend to be subject to stronger cultural noises. Therefore it will be necessary to monitor the low-frequency electromagnetic noise spectrum at the surface together with the reference calibration measurement $U(f, z_0)$.

The technique could find application in a wireline logging application or in a permanent installation. In this later case, the receiver would be deployed in production and observation hole and would monitor the variations of the formation saturation in a time-lapse fashion. The proposed technique takes advantage of no active source leading to a less complicated deployment. Only passive receivers are deployed permanently.

The invention claimed is:

1. A method of receiving and/or transmitting information in a well drilled in a geological formation between a first location and a second location, said well comprising a casing communicating with the formation, the method comprising:
   (i) placing a first transducer located at said first location, said first transducer comprising two electrodes, which are first and second downstream electrodes;
   (ii) placing a second transducer located at said second location, said second transducer comprising two electrodes, which are first and second upstream electrodes located upstream relative to the first and second downstream electrodes;
   (iii) transmitting an electric signal with the first transducer by applying said signal between the first and second downstream electrodes or respectively with the second transducer by applying said signal between the first and second upstream electrodes; and
   (iv) receiving, with the second transducer, said electric signal transmitted with the first transducer by detecting said signal between the first and second upstream electrodes, or respectively receiving, with the first transducer, said electric signal transmitted with the second transducer by detecting said signal between the first and second downstream electrodes.

2. The method of claim 1, wherein the first and second downstream electrodes are in electrical contact with the casing, and have respectively a first downstream electrical resistance and a second downstream electrical resistance when in contact with the casing and wherein the first downstream electrical resistance and/or the second downstream electrical resistance is/are below one hundred Ohms.

3. The method of claim 2, wherein the first downstream electrical resistance and/or the second downstream electrical resistance is/are below ten Ohms.

4. The method of claim 1, wherein the well further comprises a third transducer, said third transducer located at a third location and comprising two electrodes, which are first and second well electrodes, said first and second well electrodes being in electrical contact with the casing; and the method further comprising the step of:
   (i) transmitting a second electric signal with the third transducer by applying said second signal between the first and second well electrodes; and/or
   (ii) receiving a third electric signal with the third transducer by detecting said third signal between the first and second well electrodes.

5. The method of claim 4, wherein said third location is in the well.

6. The method of claim 4, wherein first and second downstream electrodes are separated from a first distance d1, said first distance d1 being dependent of intensity of the electric signal and of the distance between the first and second downstream electrodes and the first and second well electrodes.

7. The method of claim 4, wherein first and second well electrodes are separated from a third distance d3, said third distance d3 being dependent of the electric signal and of the distance between the first and second well electrodes and the first and second upstream electrodes.

8. The method of claim 1, wherein the well further comprises a plurality of additional transducers.

9. The method of claim 1, wherein the well further comprises a relay transducer, said relay transducer located at a third location and comprising two electrodes, which are first and second well electrodes, said first and second well electrodes being in electrical contact with the casing; and the method further comprising the step of:
   (i) receiving the electric signal with the third transducer by detecting said signal between the first and second well electrodes; and
   (ii) transmitting the electric signal with the third transducer by applying said signal between the first and second well electrodes.

10. The method of claim 9, wherein the well further comprises a plurality of additional relay transducers.

11. The method of claim 1, wherein the first and second well electrodes have respectively a first well electrical resistance and a second well electrical resistance when in contact with the casing and wherein the first well electrical resistance and/or the second well electrical resistance is/are below one hundred Ohms.

12. The method of claim 11, wherein the first well electrical resistance and/or the second well electrical resistance is/are below ten Ohms.

13. The method of claim 1, wherein said first location is in the well and said second location is at the surface of the ground of the geological formation.

14. The method of claim 1, wherein said first and said second locations are in the well.

15. The method of claim 1, wherein said well comprises a tubing and wherein at least one of the electrodes taken in the list: first downstream electrode, second downstream electrode, first upstream electrode, second upstream electrode, first well electrode, second well electrode, electrodes from the additional transducers, is insulated electrically from the tubing.

16. The method of claim 15, wherein the at least one electrode is further insulated electrically from other conductive elements in the well.

17. The method of claim 1, wherein first and second downstream electrodes are separated from a first distance d1, said first distance d1 being dependent of intensity of the electric signal and of the distance between the first and second downstream electrodes and the first and second upstream electrodes.

18. The method of claim 1, wherein the first and second upstream electrodes are in electrical contact with the formation at the surface of the ground.

19. The method of claim 1, wherein said well comprises a tubing and wherein the first upstream electrode is in electrical contact with the tubing and the second upstream electrode is in electrical contact with the formation at the surface of the ground.

20. The method of claim 1, wherein at least one of the transducers taken in the list: first transducer, second transducer, third transducer and relay transducer, is connected to a measurement sensor and/or a control/monitoring equipment.

21. The method of claim 20, wherein the electric signal contained information from the measurement sensor and/or to the control/monitoring equipment.

22. An apparatus for receiving and/or transmitting information in a well drilled in the geological formation between first location and second location, said well comprising a casing communicating with the geological formation, the apparatus comprising:
(i) a first transducer located at said first location, said first transducer comprising two electrodes, which are first and second downstream electrodes; and
(ii) a second transducer located at said second location, said second transducer comprising two electrodes, which are first and second upstream electrodes located upstream relative to the first and second downstream electrodes,
wherein when the first transducer applies an electrical signal between the first and second downstream electrodes, the second transducer receives said electrical signal by detecting said electrical signal between the first and second upstream electrodes, and
wherein when the second transducer applies an electrical signal between the first and second upstream electrodes, the first transducer receives the electrical signal by detecting said electrical signal between the first and second downstream electrodes.

23. The apparatus of claim 22, wherein the first and second downstream electrodes are in electrical contact with the casing and have respectively a first downstream electrical resistance and a second downstream electrical resistance when in contact with the casing and wherein the first downstream electrical resistance and/or the second downstream electrical resistance is/are below one hundred Ohms.

24. The apparatus of claim 23, wherein the first downstream electrical resistance and/or the second downstream electrical resistance is/are below ten Ohms.

25. The apparatus of claim 22, further comprising a least another third transducer, said third transducer located at a third location and comprising two electrodes, which are first and second well electrodes, said first and second well electrodes being in electrical contact with the casing.

26. The apparatus of claim 25, wherein the third transducer is a relay transducer.

27. The apparatus of claim 25, wherein said third location is in the well.

28. The apparatus of claim 25, wherein the first well electrode in any chosen in the list: a composite material which is constituted by a fine layer of polycrystalline diamond compact (PDC), a metallic bow spring, and a metallic caliper.

29. The apparatus of claim 25, wherein the second well electrode in any chosen in the list: a composite material which is constituted by a fine layer of polycrystalline diamond compact (PDC), a metallic bow spring, and a metallic caliper.

30. The apparatus of claim 25, wherein the first well electrode is located on a third packer.

31. The apparatus of claim 25, wherein the second well electrode is located on a fourth packer.

32. The apparatus of claim 25, wherein the first and second well electrodes are located on a well packer.

33. The apparatus of claim 25, wherein at least one of the transducers taken in the list: first transducer, second transducer and at least another transducer is connected to a measurement sensor and/or a control/monitoring equipment.

34. The apparatus of claim 22, wherein said first location is in the well and said second location is at the surface of the ground of the geological formation.

35. The apparatus of claim 22, wherein said first and said second locations are in the well.

36. The apparatus of claim 22, wherein said well comprises a tubing and wherein at least one of the electrodes taken in the list: first downstream electrode, second downstream electrode, first upstream electrode, second upstream electrode, first well electrode and second well electrode, is insulated electrically from the tubing.

37. The apparatus of claim 36, wherein the at least one electrode is further insulated electrically from other conductive elements in the well.

38. The apparatus of claim 22, wherein the first and second upstream electrodes are in electrical contact with the formation at the surface of the ground.

39. The apparatus of claim 22, wherein said well comprises a tubing and wherein the first upstream electrode is in electrical contact with the tubing and the second upstream electrode is in electrical contact with the formation at the surface of the ground.

40. The apparatus of claim 22, wherein the first downstream electrode in any chosen in the list: a composite material which is constituted by a fine layer of polycrystalline diamond compact (PDC), a metallic bow spring, and a metallic caliper.

41. The apparatus of claim 22, wherein the second downstream electrode in any chosen in the list: a composite material which is constituted by a fine layer of polycrystalline diamond compact (PDC), a metallic bow spring, and a metallic caliper.

42. The apparatus of claim 41, wherein deploying of the packer taken in the list: first packer, second packer, third packer, fourth packer, downstream packer and well packer is controlled by the voltage difference between first and second downstream electrodes and/or first and second well electrodes.

43. The apparatus of claim 22, wherein the first downstream electrode is located on a first packer.

44. The apparatus of claim 22, wherein the second downstream electrode is located on a second packer.

45. The apparatus of claim 22, wherein the first and second downstream electrodes are located on a downstream packer.

* * * * *